United States Patent [19]
Adler

[11] Patent Number: 5,620,724
[45] Date of Patent: Apr. 15, 1997

[54] DRINK CONTAINER WITH HOLDER FOR USED CONCENTRATE PACKET

[76] Inventor: Richard S. Adler, 69 W. 9th St., New York, N.Y. 10011

[21] Appl. No.: 102,134

[22] Filed: Jul. 26, 1993

[51] Int. Cl.$^6$ .................................................. B65B 29/02
[52] U.S. Cl. ............................ 426/77; 426/80; 426/82; 426/83; 426/435; 426/86; 99/317; 99/319; 99/321; 99/322
[58] Field of Search ............................ 426/77–83, 435, 426/86; 99/287, 295, 317, 319, 321, 322, 316, 297

[56] References Cited

U.S. PATENT DOCUMENTS

| 240,402 | 4/1881 | Gee | 99/322 |
| 814,460 | 3/1906 | Kruckewitt | 99/322 |
| 1,652,935 | 12/1927 | Goldfield | 99/317 |
| 1,785,878 | 12/1930 | Schacter | 99/322 |
| 1,879,654 | 9/1932 | Blakeslee | 99/321 |

(List continued on next page.)

FOREIGN PATENT DOCUMENTS

| 203165 | 5/1959 | Germany . | |
| 2100589 | 7/1972 | Germany . | |
| 15992 | of 1887 | United Kingdom | 99/322 |
| 9215 | of 1911 | United Kingdom | 99/316 |

*Primary Examiner*—Steven Weinstein
*Attorney, Agent, or Firm*—Rosen, Dainow & Jacobs

[57] ABSTRACT

The invention disclosed herein provides a way to engage a used concentrate packet such as a tea bag in a drink container in which a liquid product was made from the concentrate without removing the packet from the container and without having to directly contact the packet. Thus, one need not wet his or her fingers or anything in the area of the container, and the used packet when engaged will not interfere with drinking of the liquid product. The packet is also isolated from the interior of the drink container to inhibit further infusion or dissolving of any concentrate remaining in the packet, thereby to control the strength or concentration of the liquid product without having to remove the packet from the container. In the preferred embodiment the holder defines a compartment into which the used packet may be moved to isolate the packet from the interior of the drink container so as to inhibit further concentrating the liquid product from any concentrate in the packet. The compartment has a first opening thereto in the container and the flexible element passes through the opening so that movement of the flexible element towards the holder draws the packet into the compartment. The compartment is sized to allow the packet enter the compartment through the opening and be engaged in the compartment. Preferably, the compartment is sized such that the packet is squeezed when moved from the drink container into the compartment causing liquid in the packet to be squeezed therefrom. The compartment has a second opening which is sized to permit the flexible element but not the packet to pass therethrough. When the flexible element passes through the first opening and is accessible at the second opening, the flexible element may be grasped and used to move the packet into the compartment through the first opening. This may be done with a cover engaged with a disposable container. The concentrate is provided pre-measured in a packet to make a single serving or dosage, or defined multi-servings or dosages, and the packet may be provided with an easily removable protective jacket.

80 Claims, 17 Drawing Sheets

U.S. PATENT DOCUMENTS

| | | | |
|---|---|---|---|
| 2,323,468 | 7/1943 | Hevers | 99/319 |
| 2,328,599 | 9/1943 | Armstrong | 99/319 |
| 2,591,606 | 4/1952 | Reed | 99/321 |
| 2,678,000 | 5/1954 | Scheidt et al. | 99/287 |
| 2,743,664 | 5/1956 | Dale . | |
| 2,860,989 | 11/1958 | Geisinger . | |
| 2,887,037 | 5/1959 | Setecka . | |
| 2,905,074 | 9/1959 | Newman | 99/319 |
| 2,967,776 | 1/1961 | Utley . | |
| 2,972,406 | 2/1961 | Mayer . | |
| 3,134,307 | 5/1964 | Loeser . | |
| 3,301,145 | 1/1967 | Bodendoerfer . | |
| 3,745,891 | 7/1973 | Bodendoerfer . | |
| 3,861,284 | 1/1975 | Costello . | |
| 3,870,220 | 3/1975 | Koury et al. . | |
| 3,985,069 | 10/1976 | Cavalluzzi . | |
| 4,153,153 | 5/1979 | Herzog | 206/0.5 |
| 4,338,338 | 7/1982 | Popkes | 426/82 |
| 4,349,345 | 9/1982 | Bodendoerfer . | |
| 4,490,130 | 12/1984 | Konzal et al. . | |
| 4,602,557 | 7/1986 | Yip | 99/279 |
| 4,688,479 | 8/1987 | Cunningham | 100/133 |
| 4,864,921 | 9/1989 | Ross | 99/319 |
| 4,875,574 | 10/1989 | Travers | 206/0.5 |

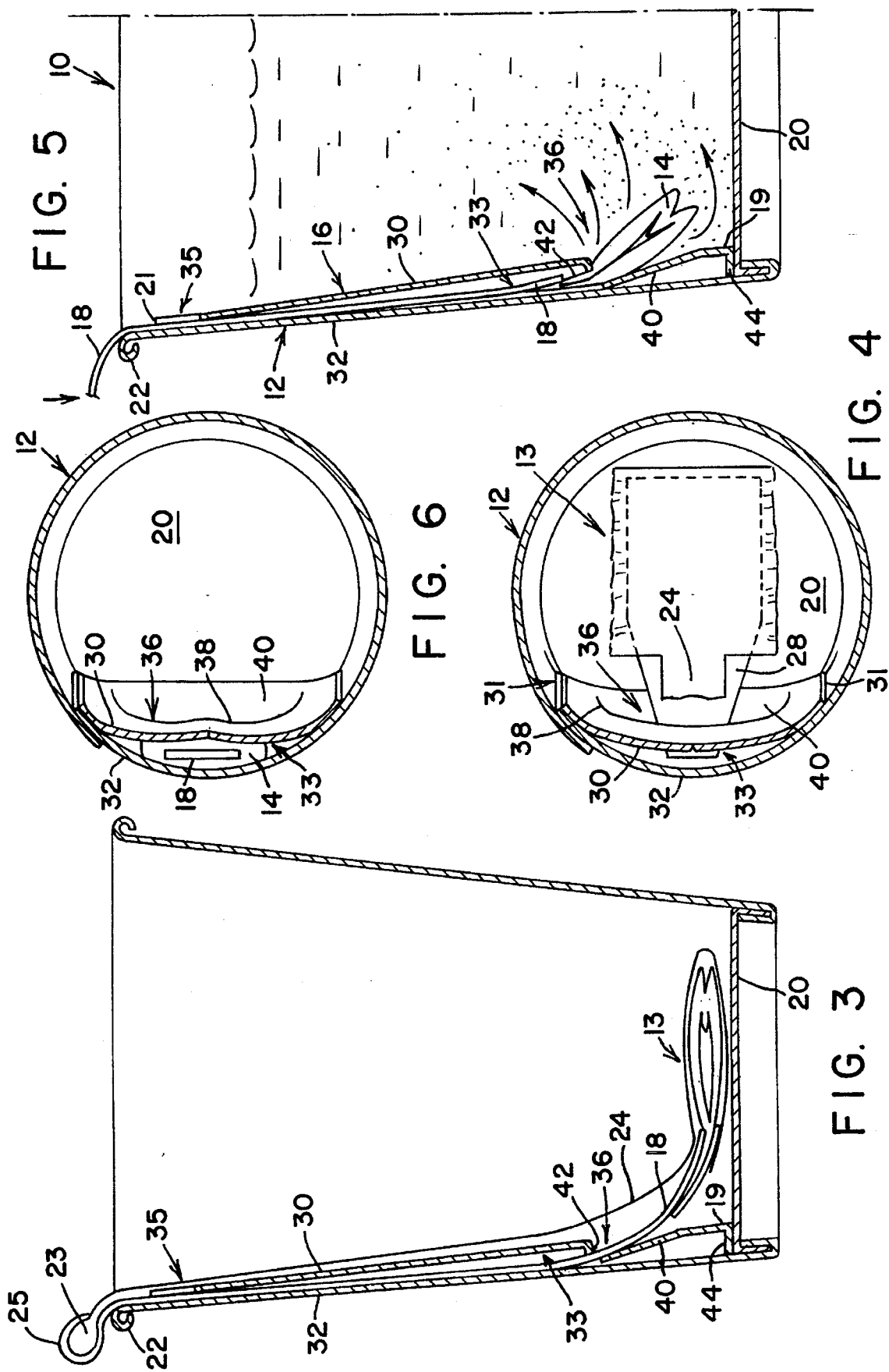

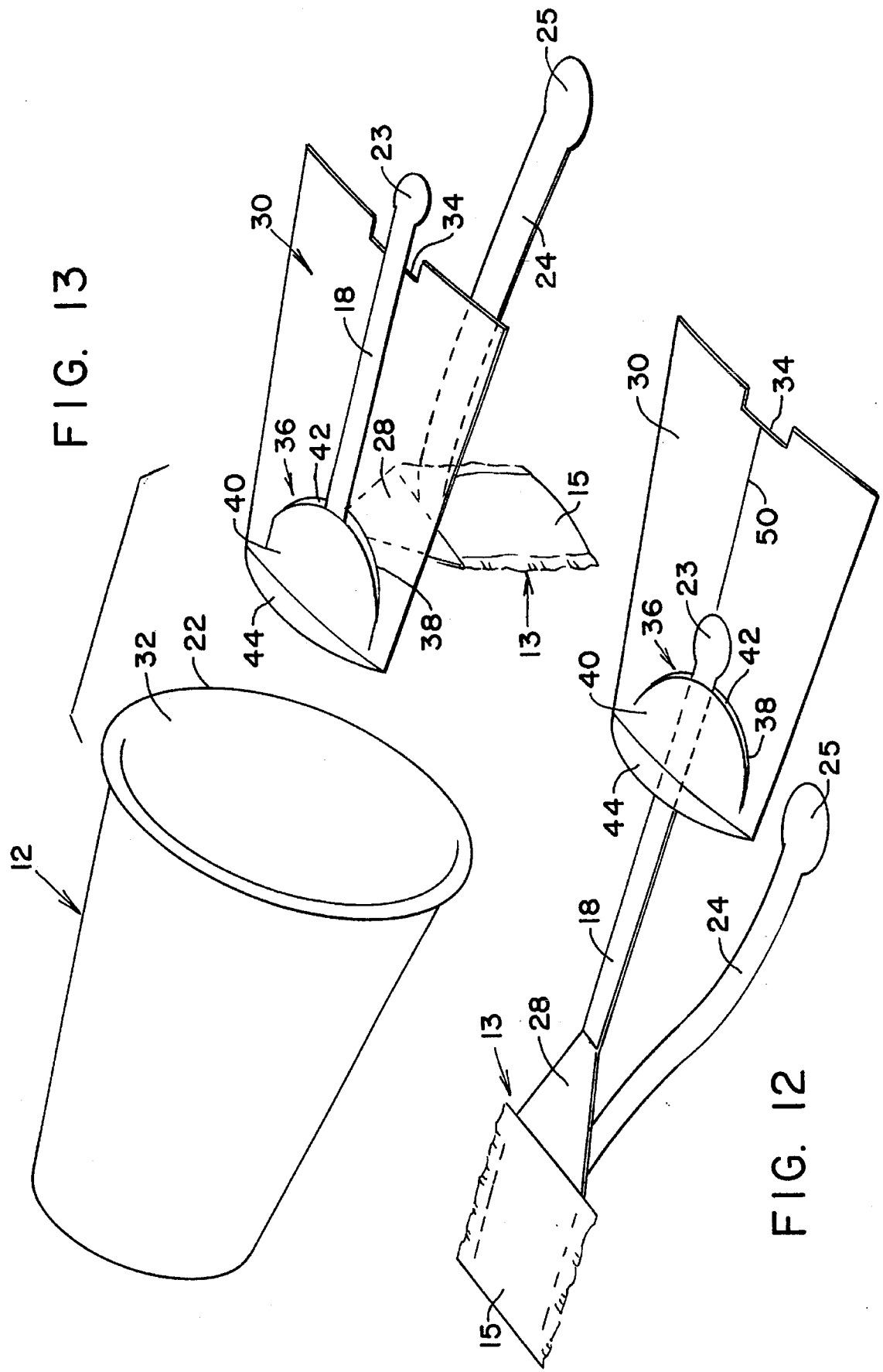

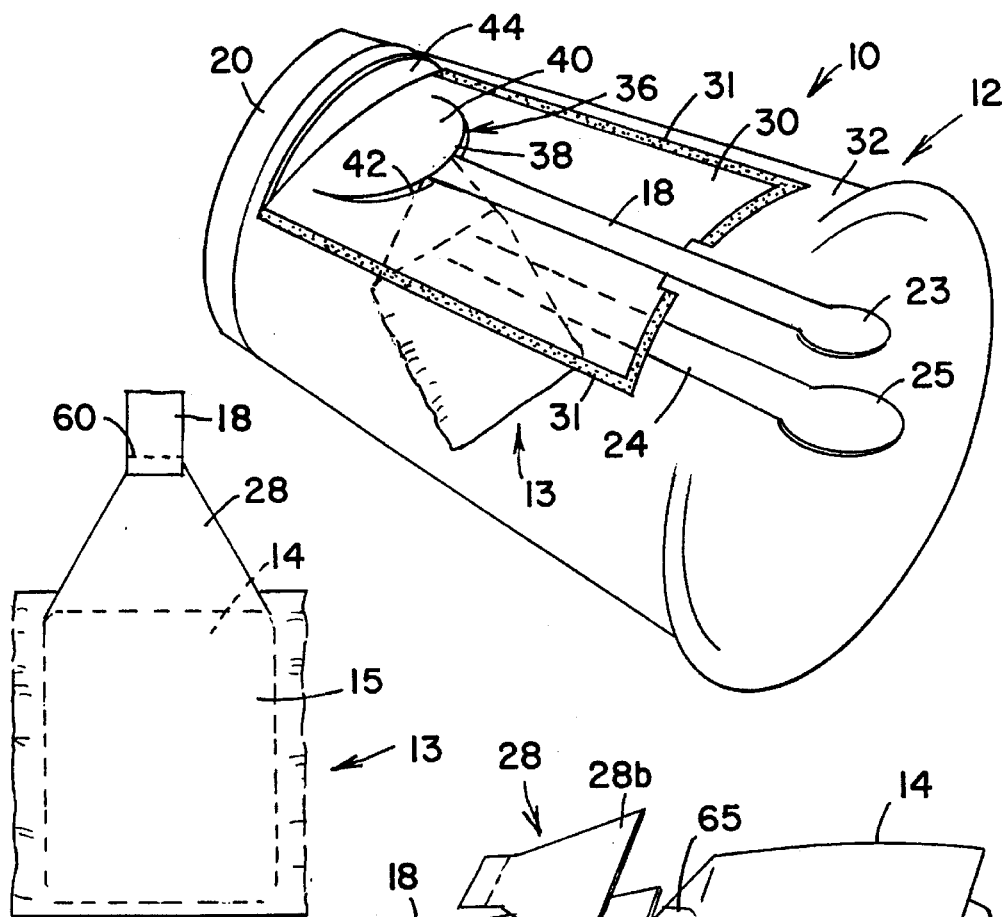
FIG. 14
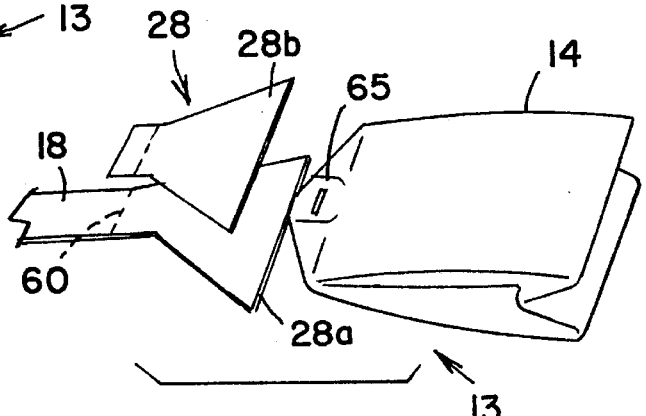
FIG. 17
FIG. 15
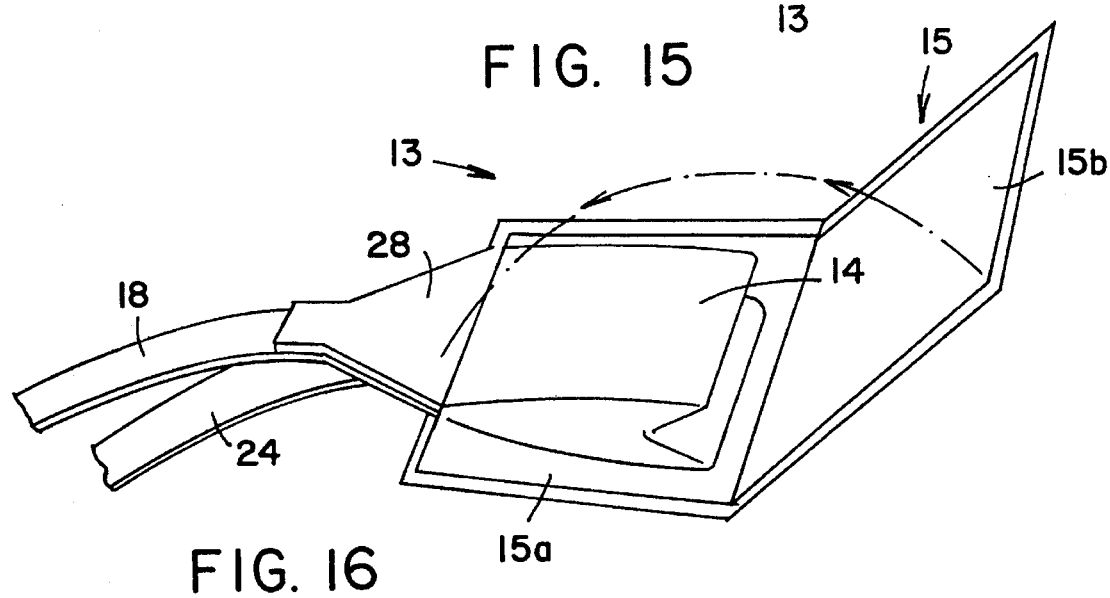
FIG. 16

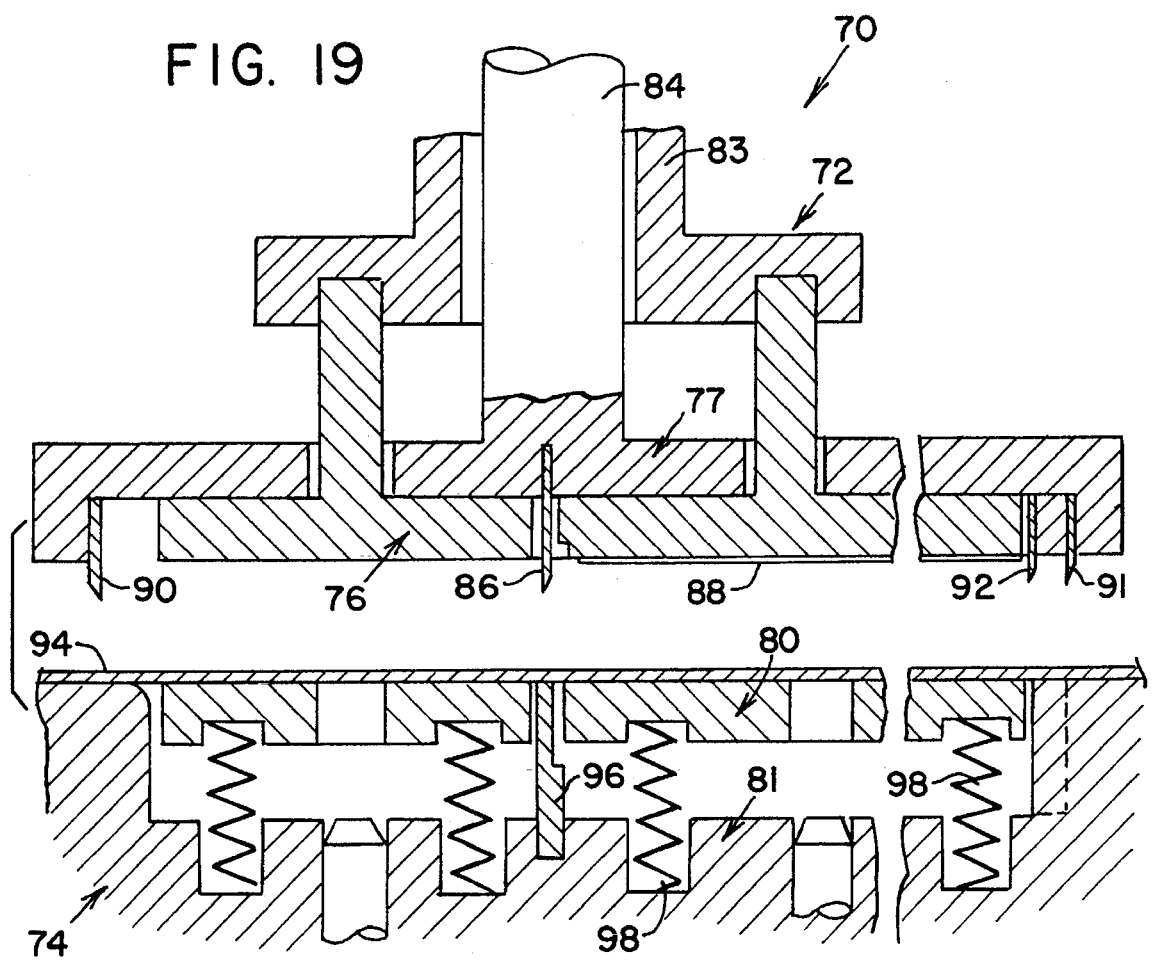
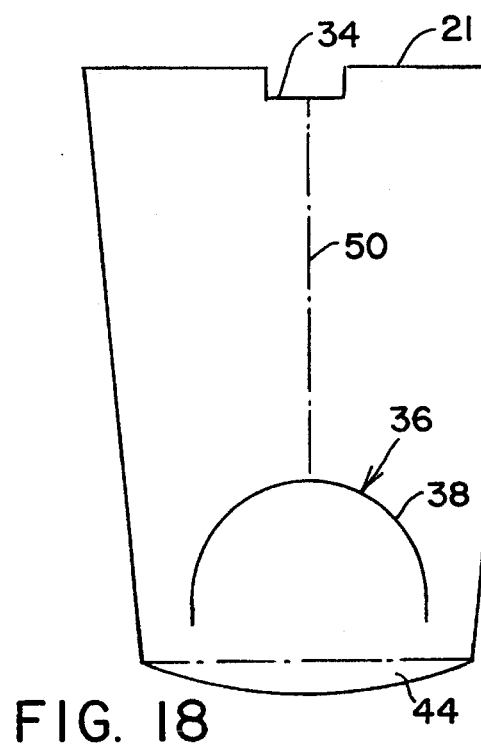
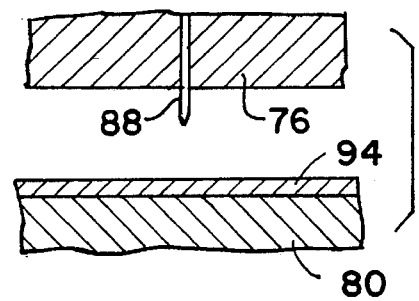
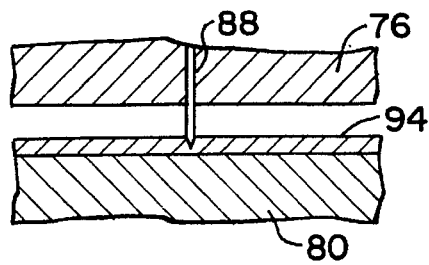

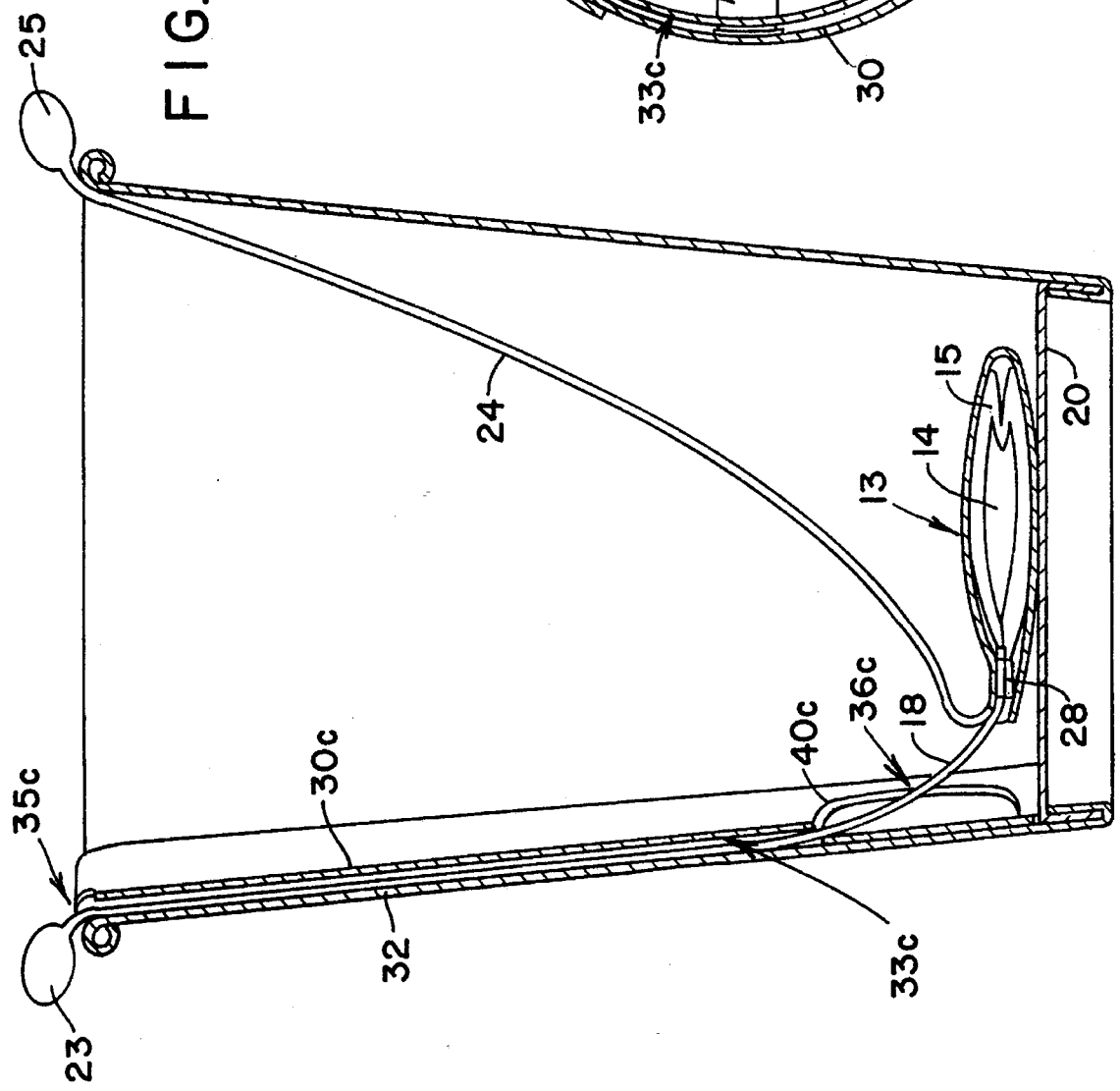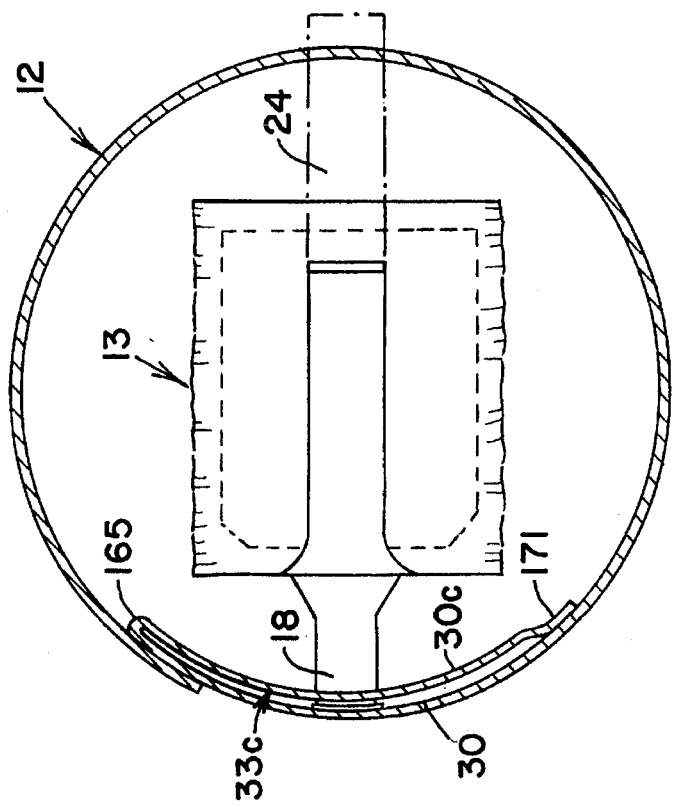

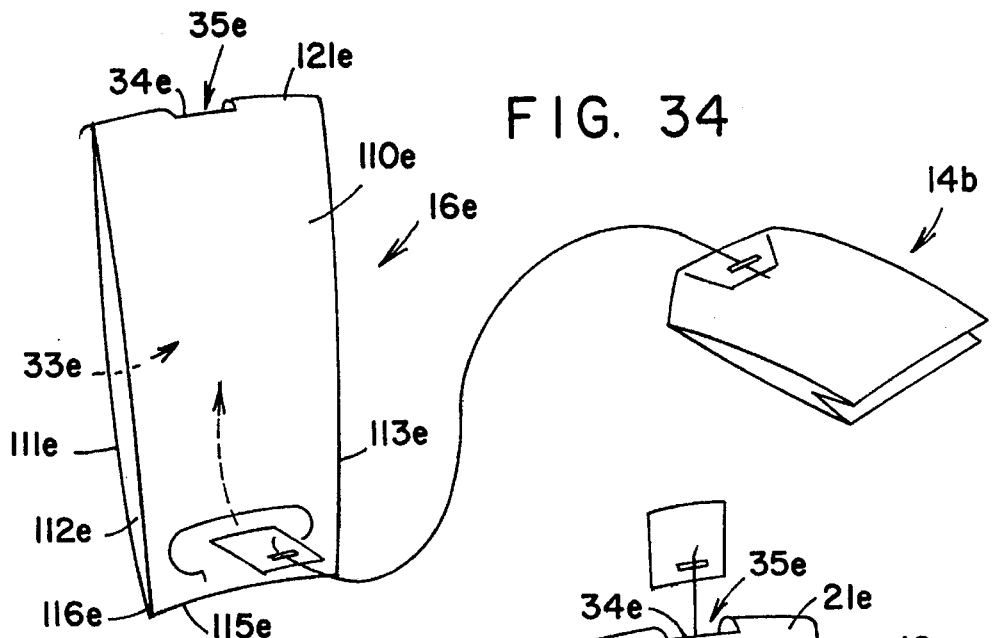
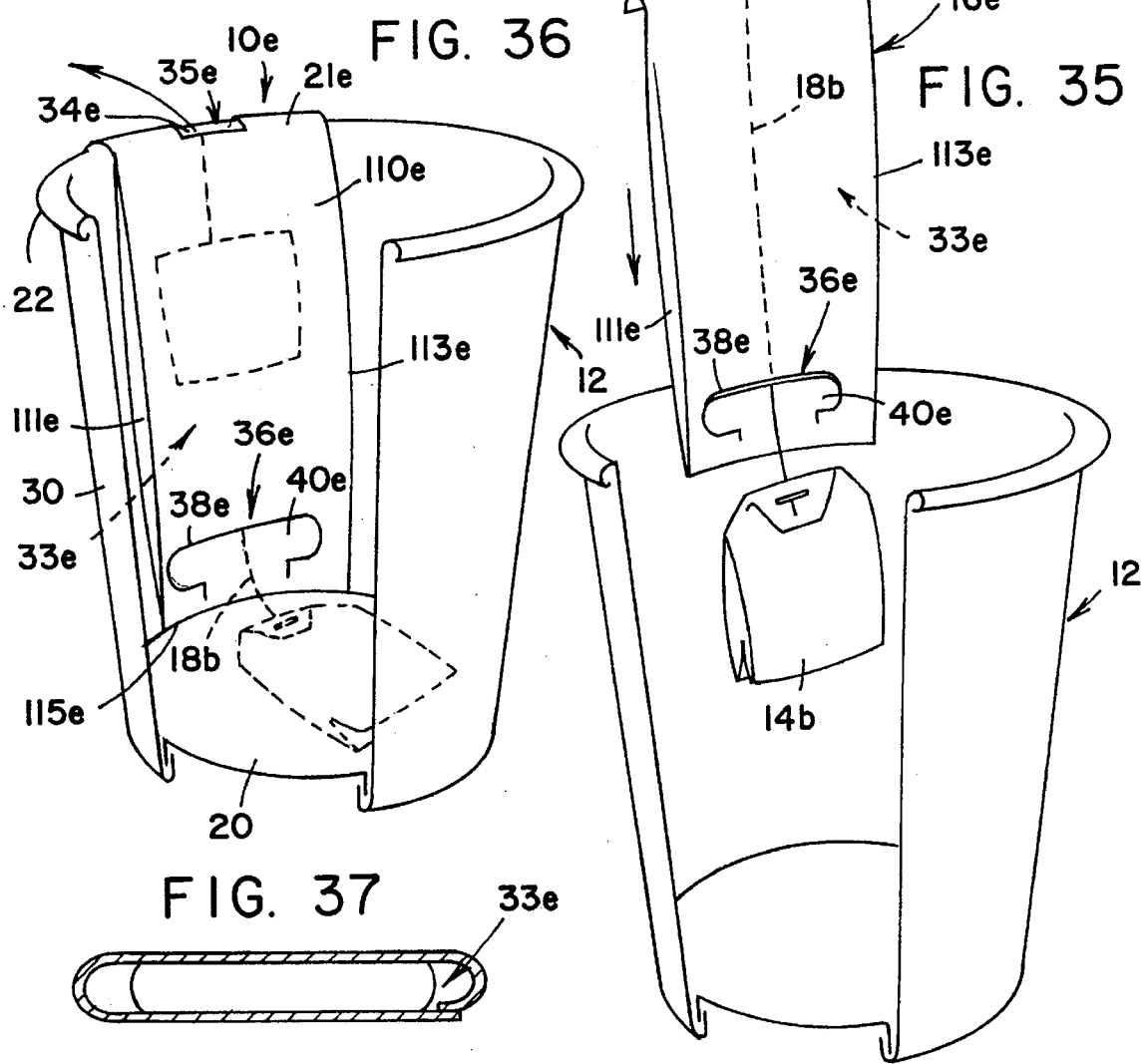

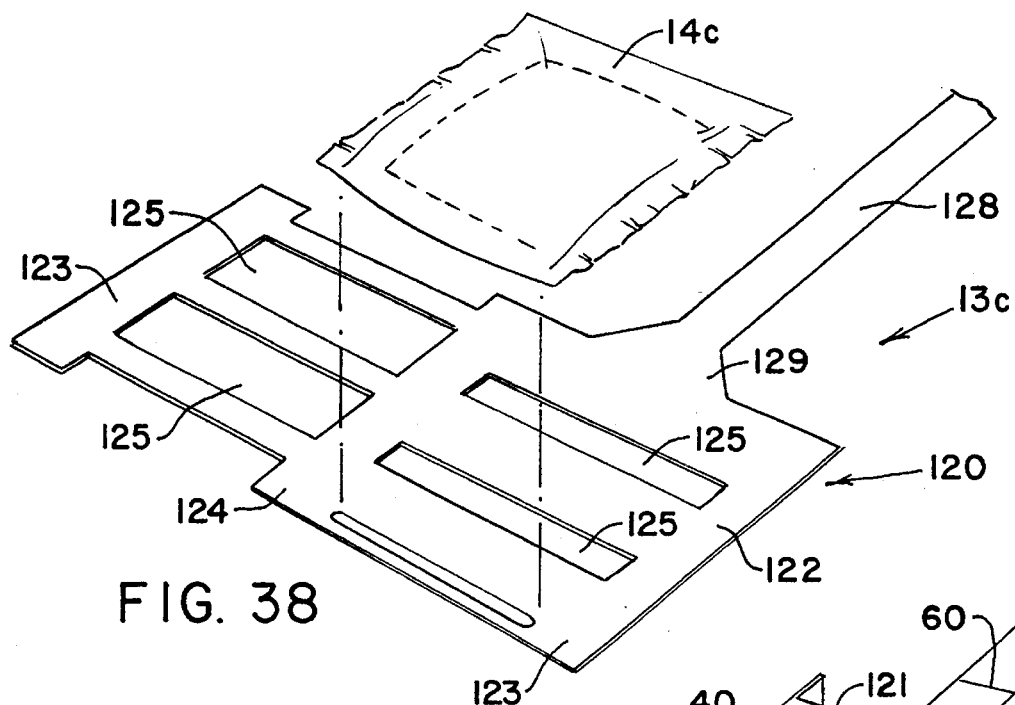
FIG. 38
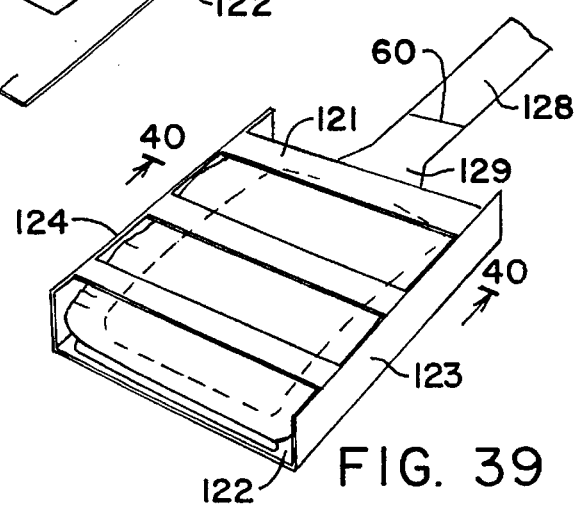
FIG. 39
FIG. 40
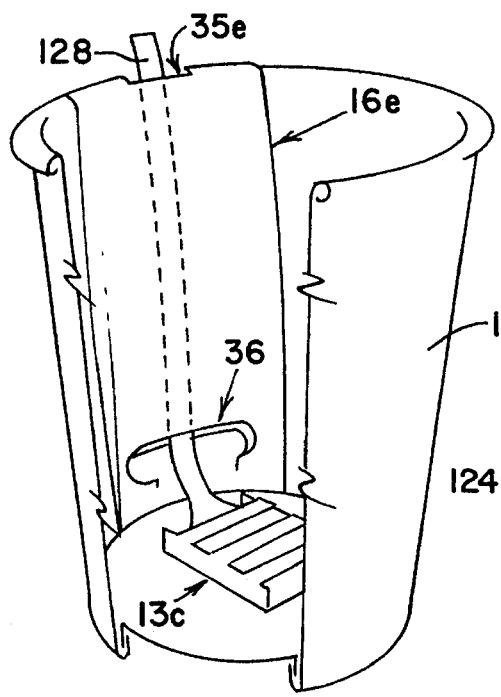
FIG. 42
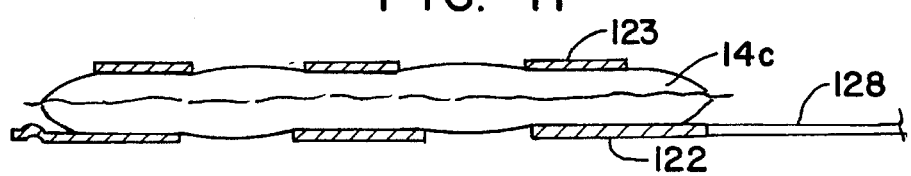
FIG. 41

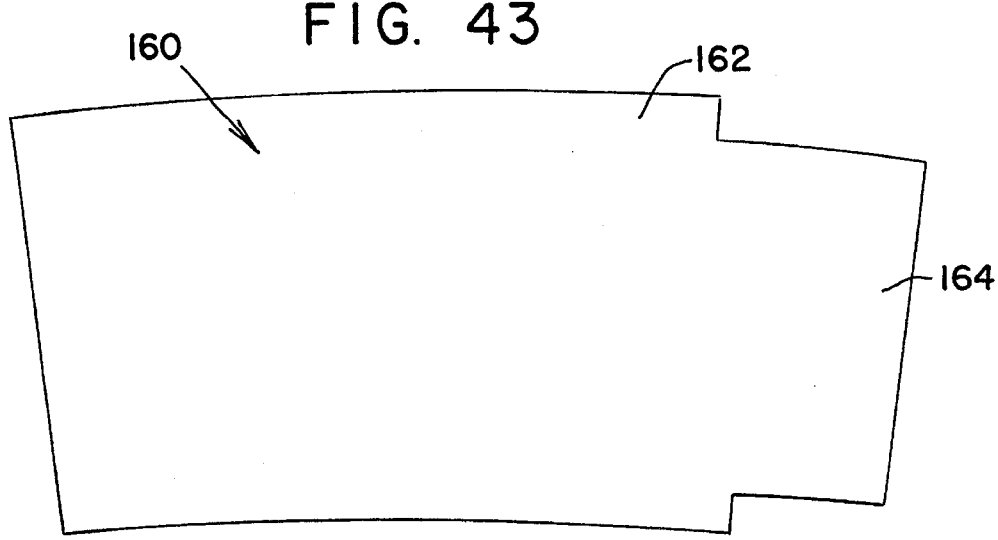
FIG. 43
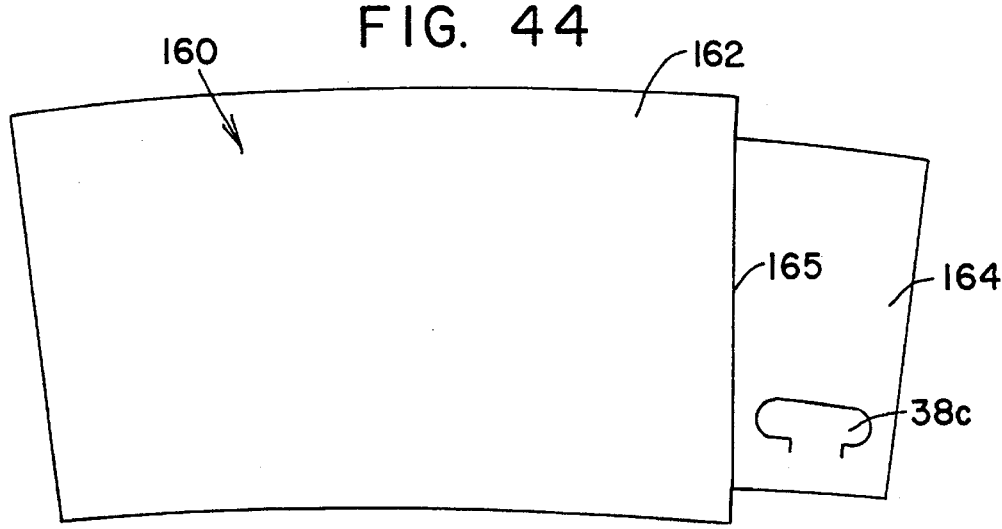
FIG. 44
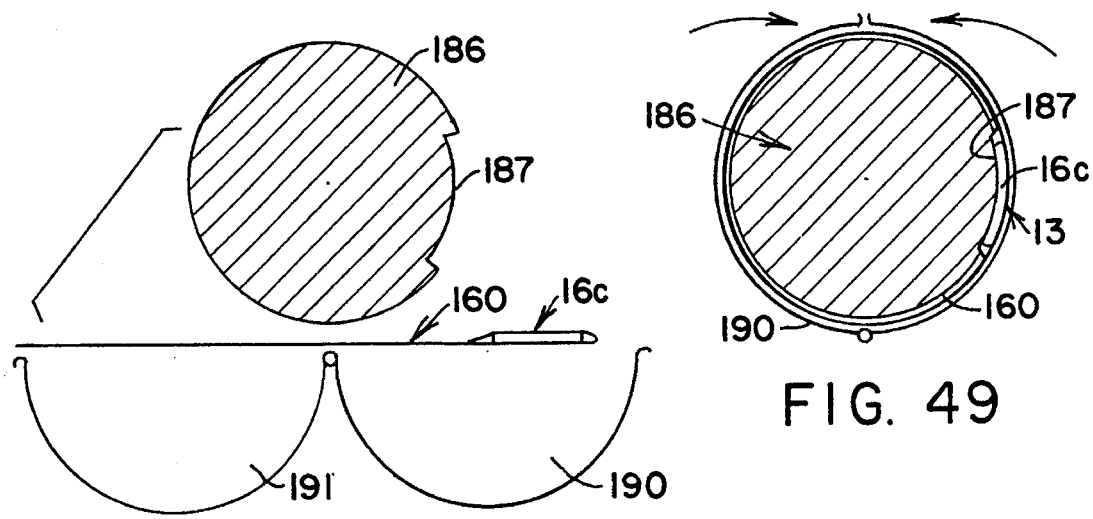
FIG. 48
FIG. 49

DRINK CONTAINER WITH HOLDER FOR USED CONCENTRATE PACKET

BACKGROUND OF THE INVENTION

The invention disclosed herein relates to a drink container with a holder, compartment or the like (hereafter referred to simply as either a holder or a compartment) and to a holder for a drink container which isolates a packet containing or having contained a concentrate, either a non-dissolvable concentrate such as a tea or a dissolvable concentrate such as instant coffee, from which a liquid product can be made by adding hot, cold or warm liquid to the drink container. The invention relates to such holders which are manufactured together with the drink container and are supplied as a unit, sometimes containing the packet, as well as to holders which are manufactured separately from drink containers and are inserted into a disposable or non-disposable drink container when used. The invention also relates to methods for making drinkable liquid products from packets containing concentrates. The invention has particular application to making single or pre-measured servings or dosages of drinkable liquid products, particularly in disposable drink containers, while providing for isolation of the packet from the liquid product after the liquid product has been made. The liquid product may be a beverage such as tea, coffee, lemonade, hot chocolate, etc., medicines, etc., either hot or "iced" and either instant or non-instant, i.e., made from dissolvable, partially dissolvable or non-dissolvable concentrates. The packet, when it is isolated from the liquid product, may contain non-dissolvable concentrate, or the undissolved part of a dissolvable concentrate, or nothing at all if all of a dissolvable concentrate in the packet dissolved in the liquid.

While the invention has application to drinkable products other that beverages, e.g., medicines, and to beverages other than tea, the invention will be described using tea as an example and as the preferred embodiment to facilitate a description of the invention. The terms "dissolvable" and "non-dissolvable" are meant in a broad sense, and "non-dissolvable concentrate" as used herein and encompasses concentrates which produce drinkable products by physical and/or chemical interaction with a liquid and leave a non-dissolvable portion after the liquid product has been made.

There have been many advances in disposable drink containers. For example, covers to disposable cups are now provided with pre-weakened portions so that a hole in the cover may be opened and the beverage sipped through the hole without having to remove the cover. Such an advance allows one to drink the beverage while standing, walking, working, riding in a car, bus or train, etc. without spilling the beverage. However, even with such advances, inconveniences remain with respect to beverages made in disposable cups from indissolvable concentrates such as non-instant tea and non-instant coffee (ground, non-instant coffee is now supplied, like tea, in single serving bags).

For example, when brewing tea in a disposable cup there are the problems of conveniently stopping brewing at the desired strength of the tea and conveniently without wetting, burning or staining disposing of the tea bag when one decides to stop the brewing. Typically, when one purchases tea in a disposable cup, hot water is added to the cup with the tea bag already in the cup so that brewing starts immediately. Yet, the purchaser typically is not ready to drink the tea until later when the purchaser reaches his or her destination (or the tea ordered by telephone reaches its destination), so brewing continues until the purchaser drinks the tea; or if the purchaser is ready to immediately drink the tea and wants to stop the brewing, he or she has no convenient way of disposing of the tea bag.

Not placing the tea bag into the cup at the point of purchase when the hot water is added to the cup cures only a part of the problem. This particular action unfortunately produces other problems. For example, if one decides to drink the tea other than at a table, desk, etc., it typically becomes inconvenient to remove the top of the cup, insert the tea bag and brew the tea to the desired color or concentration before removing the bag. Not only does the problem of disposing of the tea bag remain, but there frequently is the inconvenience of having to remove (and possibly re-engage) the cover as well as inserting and removing the tea bag. This must of course be done without spilling any tea since the purchaser may be standing, driving, riding in a commuter train, etc, and/or may be carrying additional items such as a pocket book, brief case, newspaper, package, etc. Note that regardless of where the purchaser drinks the tea, the bag must be removed from the cup with the risk that the soaked tea bag will drip. If one avoids the drippage and disposal problems by not removing the tea bag from the cup, then the tea will continue to brew and may become too strong. This strong tea may not only be distasteful, but also may be unhealthy due to the acid and/or caffeine concentration.

The above problems exist for tea bags with and without strings attached thereto. For tea bags without strings, there is the additional problem of somehow grasping the tea bag to remove it from the cup.

Many of the inconveniences and drawbacks described above with respect to tea are also present in the use of other non-dissolvable concentrates for beverages, medicines (e.g., in gel-caps), etc.

U.S. Pat. Nos. 2,687,037 (Setecka) and 3,861,284 (Costello) disclose devices which allow one to withdraw a tea bag from the water in a disposable cup into or onto the cover for the cup. U.S. Pat. No. 4,864,921 (Ross) discloses a mug having a tea bag holder formed in the top of a handle of the cup into which a tea bag may be slid from the water in the cup. In the device disclosed in the Setecka '037, the cover has to be removed from the cup in order to store the tea bag in the cover after the tea bag has been used in the hot water. This presents inconveniences as described above. The device disclosed in the Costello '284 Patent has a relatively large funnel-like device into which the tea bag is withdraw and which is attached to and protrudes from the top of the cover. Because of the protruding funnel-like device, the cover as a practical matter must be separated from the cup in order to drink the tea from the cup. This also presents the inconveniences discussed above. The mug disclosed in the Ross '921 Patent has a compartment projecting transversely from the top of the mug such as in the top of a handle of the mug, which precludes the mug from nesting with other mugs and which may make the mugs too expensive to be considered disposable. Therefore, there is a need for a holder incorporated into or otherwise associated with a drink container which permits a packet which is pre-loaded (and preferably fresh-wrapped) with an undissolved concentrate to be isolated from a liquid poured into the drink container without separating the packet from the drink container, and in the case of a disposable, coverable drink container, having the packet system work in harmony with the standard removable cover system of the drink container.

As mentioned above, the invention also has application to preparation of liquid products from dissolvable concentrates, for example, beverages made from "instant" mixes such as instant coffee and tea, and to pre-measured dosages of medicines made from dissolvable medicinal concentrates. Here "medicine" has a broad meaning and encompasses prescription and non-prescription drugs, pain relievers, flu and cold preparations, ant-acids, indigestion and upset stomach preparations, dietary supplements, etc. Where the medicines are non-dissolvable concentrates, many of the problems discussed above exist.

For concentrates which are dissolvable so that little or no concentrate remains after the liquid product is made, the concentrates are typically provided in bulk or in single serving or pre-measured packets which must be opened and emptied into a drink container. Single serving and pre-measured packets have the drawback of typically being stored separately from the drink containers and require one to grasp the packet, open it and empty the contents into the drink container without spilling any of the concentrate. Transferring measured amounts of concentrate from a bulk container of course is time consuming, and is subject to mis-measurement, spillage, spoilage and contamination. Also, bulk materials are not subject to precise accountability, which is important for drugs. While such drawbacks may not be serious for most non-volume users such as non-indisposed individuals and families in their homes, they can present significant inconvenience for volume users such as fast food and take-out restaurants, institutions, the elderly and the handicapped, etc. Therefore, it would be highly desirable to have single and pre-measured servings and dosages of dissolvable (and non-dissolvable) concentrates associated with disposable drink containers which avoid the foregoing inconveniences.

U.S. Pat. Nos. 2,967,776 (Utley), 2,972,406 (Mayer) and 3,870,220 (Koury et al.) disclose containers which include structure that holds a single serving of a dissolvable beverage concentrate. However, the invention presents another way for associating dissolvable concentrates with disposable drink containers in pre-measured amounts.

OBJECTS AND SUMMARY OF THE INVENTION

It is an object of the invention disclosed herein to eliminate or lessen the inconveniences and drawbacks discussed above associated with preparation of drinkable liquid products in drink containers from concentrates.

It is another object of the invention to provide a drinkable liquid product system which is self-explanatory (i.e., is simple and obvious to use without instructions, etc.), which involves only simple handling and does not require undue eye-hand coordination to make the liquid product, and yet is accurate and disposable, and so suitable for fast food applications, the handicapped and the elderly.

It is another object of the invention to facilitate making a drinkable liquid product in a drink container from a concentrate contained in a packet while avoiding or minimizing the inconveniences and drawbacks discussed above and/or while making an improved liquid product.

It is another object of the invention to prepare drinkable liquid products of desired strength in drink containers from non-dissolvable concentrates and to do so without having to remove the non-dissolvable concentrate from the drink container after the liquid product has been prepared to the desired strength.

It is another object of the invention to isolate in a drink container a packet which contains or contained a concentrate used to make a drinkable liquid product in the drink container when liquid is added to the drink container without wetting, burning, staining, etc., one's fingers.

It is another object of the invention to isolate in a drink container a packet which contains or contained a concentrate used to make a drinkable liquid product in the drink container when liquid is added to the drink container without having to directly handle the packet.

It is another object of the invention to isolate such a packet which contains or contained a non-dissolvable concentrate, a dissolvable concentrate, or both, particularly a packet containing a beverage concentrate such as tea or coffee, or a medicinal concentrate.

It is another object of the invention to isolate the used packet as described in the two previous objects without removing the packet from the drink container.

It is another object of the invention to provide a disposable drinkable liquid product system in which a packet pre-loaded with a dissolvable or non-dissolvable concentrate is pre-attached to a drink container or to an insert which is engaged with the drink container, maintaining product freshness until such time as one wants to add the liquid to the drink container.

It is another object of the invention to provide a drinkable liquid product system in a drink container from a pre-loaded, fresh-wrapped packet without having to directly handle the packet to remove the fresh-wrapped covering from the packet.

It is another object to provide such systems in which the packet or packets after use may be isolated from the liquid product without directly handling it or them, and preferably without removing the packet(s) from the drink container.

It is another object of the invention to provide a disposable drink container which has a holder for isolating such a packet which contains or contained a concentrate from a drinkable liquid product in the drink container, after the packet is used to make a drinkable liquid product in the container when liquid is added to the container.

It is another object of the invention to provide a disposable drink container which has such a holder incorporated into the drink container so that the drink container and holder are supplied as a unit.

It is another object of the invention to provide such a holder as a separate unit or insert which may be engaged with a disposable or non-disposable drink container at the desired time, and thereafter may either be removed from the container or become and remain affixed thereto.

It is another object of the invention to provide such holders which are either supplied with or already attached to a drink container which isolate the used packet to a location where it does not interfere with drinking the liquid product, and such that the packet effectively can not continue to make liquid product or increase the concentration thereof, or both.

It is another object of the invention to provide such holders which squeeze the packet as it is moved to an isolating location.

It is another object of the invention to provide such a separate holder, with or without a packet, which may be added to a pre-printed drink container so that one may use the pre-printed that he or she normally uses and simply add the separate holder thereto. It is another object of the invention to provide a disposable drink container with a standard removable cover and a holder either incorporated in the drink container or engageable with the drink container as described in the above objects in which the packet described in the above objects may be withdrawn into the holder without removing the cover from the drink container.

It is another object of the invention to provide a drinkable liquid product system which is entirely disposable, for example, includes a disposable drink container, a disposable packet which was pre-loaded with a concentrate from which the liquid product was made and a disposable holder for isolating the packet from the liquid product in the drink container. It is another object of the invention to use and dispose of such a system without removing the packet from the drink container and without otherwise having to directly handle the packet.

It is another object of the invention to provide a concentrate packet having an elongated flexible element or pull tab connected to the packet for use in a drinkable liquid product system which isolates the packet from liquid product in a drink container, in which the flexible element may be severed from the packet after the packet has been isolated, e.g., moved into a compartment within the drink container. It is another object of the invention to provide a protective jacket for such a packet which has an elongated flexible element or pull tab attached thereto by means of which the jacket can be removed from the packet without directly handling the packet.

It is another object of the invention to provide a drinkable liquid product system which uses a drink container and a packet pre-loaded with a single or pre-measured multi-serving dissolvable or non-dissolvable concentrate which is scalable, i.e., may use different size drink containers and different size packets or multiple packets.

It is another object of the invention to provide a drinkable liquid product system as described above in which the drink containers with the holders engaged therewith are stackable, with and without a packet attached to the holder.

It is another object of the invention to provide liquid product systems as described in the above objects that uses either a standard or custom packet, e.g., a standard tea bag, and packets of different size and shape.

It is another object of the invention to provide a holder for a "stringless" packet containing a concentrate used to make a drinkable liquid product.

It is a specific object of the invention to eliminate or lessen the inconveniences and drawbacks discussed above associated with brewing tea and similar beverages in a disposable cup.

Another object of the invention is to provide drink containers incorporating holders which are described in the above objects of the invention which are practical, lend themselves to economical mass production manufacturing techniques by modification of, or addition of operations to, standard drink container construction machinery, and which are commercially feasible and low in cost. It is another object of the invention to provide such drink containers and holders which are made from the same materials to simplify the material handling and processing aspects of manufacture.

The invention disclosed herein achieves many of the above and other objects by providing a way to engage the used concentrate packet within the drink container without removing the packet from the container and without having to directly contact the packet. Thus, one need not wet his or her fingers or anything in the area of the container to engage the packet within the container, and the used packet once engaged will not interfere with drinking of the liquid product.

Some objects are achieved by also isolating the packet from the interior of the drink container to inhibit further infusion or dissolving of any concentrate remaining in the packet, thereby controlling the strength or concentration of the liquid product without having to remove the packet from the container.

Other objects are achieved by attaching an element to the packet which allows one to both push and pull on the packet in the container from outside the container to aid in making the liquid product, and then to move the packet to be engaged and/or isolated in the container.

Still other objects are achieved by providing a packet system and a drink system in which the concentrate is provided pre-measured in a packet to make a single serving or dosage, or defined multi-servings or dosages, and the packet may be provided with an easily removable protective jacket.

Further objects are achieved by making the structure which engages or isolates the packet, and a cup to which such structure is removably or non-removably attached disposable. Then, one need not directly handle the packet at all from the time that liquid is poured into the container until the time the packet is disposed of, and one need not directly handle the structure which engages or isolates the packet if the container itself is disposable. In the case of a disposable container, one may simply dispose of the container when he or she is finished with it, without ever having to directly handle the packet.

One embodiment of the invention provides a disposable drink container and a holder supported in the drink container by the drink container. The holder is constructed and positioned such that a packet used to make a drinkable liquid product in the drink container may be moved into engagement with the holder from the interior of the drink container without removing the packet from the drink container. The holder may be constructed to engage the packet when the packet is pushed into engagement with the holder by a relatively stiff implement such as a spoon or plastic stirrer, or the packet may have attached to it an element which can be grasped outside of the container to effect movement of the packet inside the container. The holder may be removably attached to the container, in which case the container need not be disposable, or the holder may be non-removably attached to a disposable container. A means for engaging a separate holder with the drink container may comprise a curved flange or lip at an end of the holder adapted to engage and hang from a rim of the drink container into the drink container.

A disposable packet/holder system according to the invention comprises such a holder to which is coupled the packet so that they may be provided and disposed of as a unit, and a disposable drink system according to the invention comprises such a holder with the packet coupled thereto and a disposable cup to which the holder is removably or non-removably engaged. Preferably, the coupling means allows the packet to be moved inside the container from outside of the container with a cover engaged with the top of the container.

The means coupling the packet to the holder (or otherwise to the container) may comprise a flexible element attached to the packet. The flexible element is preferably somewhat stiff to allow one to both push and pull the packet, as discussed above. A holder used with a packet having a flexible element connected thereto is constructed to engage the packet when the flexible element is moved relative to the holder to draw the packet to the holder.

In the preferred embodiment the holder defines a compartment into which the used packet may be moved to isolate the packet from the interior of the drink container so as to inhibit further concentrating the liquid product from any concentrate in the packet. The compartment has an opening (first opening) thereto in the container and the flexible element passes through the opening so that movement of the flexible element towards the holder draws the packet into the compartment. The compartment is sized to allow the packet to enter the compartment through the opening and be engaged in the compartment. Preferably, the compartment is sized such that the packet is squeezed when moved from the drink container into the compartment causing liquid in the packet to be squeezed therefrom.

The compartment may have another opening (second opening) which is sized to permit the flexible element but not the packet to pass therethrough. When the flexible element passes through the first opening and is accessible at the second opening, the flexible element may be grasped and used to move the packet into the compartment through the first opening. The flexible element may include an enlarged or transition portion adjacent the packet which becomes wedged in the second opening when the flexible element is pulled to move the packet as far as it will go in the compartment. This may be done with a cover engaged with a disposable container. Such a holder and a packet coupled thereto may form a packet system, and such a holder, a disposable container and a packet coupled to the holder or otherwise to the container may form a disposable drink system.

In one embodiment, the first opening comprises a hinged flap adapted to substantially close the first opening when the packet is moved into the compartment so that the flow of liquid between the drink container and the compartment is inhibited. The hinged flap may be defined by a curved cut in a wall section defining compartment.

The flexible element may include a weakened portion close to the packet such that the flexible element may be severed thereat and separated from the packet. When the second opening is located adjacent and below a top of the drink container, the flexible element may be severed from the packet at the weakened portion at the second opening so that no part of the flexible element will be outside the drink container.

The holder is preferably made of a material impervious to the liquid added to the container, and is closed between the first and second openings in order to provide good isolation between the used packet and the interior of the drink container. The first and second openings are spaced sufficiently so that the packet fits in the holder between the first and second openings, and the second opening is above the first opening relative to the drink container when the holder is engaged therewith. The holder may be sized to extend for a major portion of a side wall of the drink container with the first opening being near the bottom of the drink container and the second opening being near the top of the drink container, or may be sized to extend for a minor part of a side wall of the drink container with the first opening being spaced a substantial distance above the bottom of the drink container and the second opening being above the first opening.

As discussed above, the holder may be a separate piece from the drink container and is removably engaged therewith by engaging means, or the holder may be non-removably engaged with the container. In the latter embodiment, at least part of the holder may be integral with the container by the engaging means, or the holder may be a separate piece which is non-removably attached to the container. In the preferred embodiments, the holder comprises opposed spaced wall sections joined to form a compartment. In one embodiment, one of the wall sections is defined by a portion of a sidewall of the container and the other wall section is non-removably attached to the container sidewall such that the wall section and a portion of the container sidewall adjacent the wall section define the compartment. The other wall section may have one end integrally joined to the sidewall and folded onto the sidewall to form the compartment.

In another embodiment, the sidewall sections may be separate from the container, and the joined sidewall sections are removably or non-removably engaged with the container. One or both wall sections may be cut to form the first and second openings referred to above, or portions of the sidewalls may not be joined, i.e., left open, to form the openings.

The wall section(s) may be made of untreated paper, or a paper coated with a thin film of thermoplastic, or plastic. The drink container and the wall section are preferably made of the same material, and may be integrally molded (injection molded, blow molded, etc.), made from sheet material which is worked to form the drink container and the compartment, or may comprise sheet material and molded material which form the compartment and the drink container.

The packet may comprise a standard packet, such as a standard tea bag with or without the string, or a custom packet. In some embodiments, a protective jacket may be provided enclosing the packet and means are provided for easily removing the jacket from the packet while the packet remains within the drink container. The jacket may be impermeable and be sealed airtight, or the jacket may be paper, or the jacket may be paper coated with a material which at least impedes the flow of air through the jacket. According to one embodiment, the jacket comprises a sheet folded on itself to form two sheet halves which are joined along their peripheries so as to be relatively easily separated again, and the means for removing the jacket comprises another flexible element connected to the jacket and being of sufficient length to reach and project from the top of the drink container when the packet is at the bottom of the drink container such that the other flexible element when pulled while the flexible element connected to the packet is held separates the sheet halves along their joined peripheries as the entire jacket is pulled completely out of the drink container.

The packet may comprise an inner package containing the concentrate and a holder containing the inner package, with the holder for the inner package having openings therein to allow liquid to pass therethrough and contact the inner package, and a flexible element connected to the holder for the inner package.

The concentrate may be in shredded, granular, powder, liquid or solid form, and may be in leaf form, or ground bean, or a tablet, caplet, capsule or gel-cap. In the illustrated embodiments, the concentrate is tea leaves and the packet is a tea bag. The drink container in the illustrated embodiments is a single serving, disposable cup.

A method according to the invention of stopping the infusion, mixing, dissolving and the like of a concentrate into a liquid during the preparation of a drinkable liquid product in a drink container, comprises a packet in the drink container containing a concentrate from which the liquid product is made by exposing the concentrate to a liquid; adding liquid to the container; and when the liquid product has been formed to the desired strength or concentration, isolating the packet in the container without removing the packet from the container.

A method according to the invention of making a drinkable liquid product in a drink container having a cover engageable therewith, comprises: providing a compartment within the drink container; providing a packet in the drink container containing a concentrate from which the liquid product is made by exposing the concentrate to a liquid and means, e.g., a flexible element, extending from the drink container for moving the packet within the drink container into the compartment, whereby one may move the packet in the container from outside the container; adding liquid to the container; engaging the cover with the container; and moving the packet into the compartment with the cover engaged to the drink container using the means for moving.

A method according to the invention of infusing, dissolving, mixing, etc. a concentrate from a packet thereof into a liquid to form a drinkable liquid product in a drink container, comprises: providing a packet in the drink container containing the concentrate from which the liquid product is made by exposing the concentrate to a liquid and a flexible element attached to the packet and extending from the drink container for moving the packet within the drink container from outside the container, the flexible element being sufficiently stiff to push as well as pull the packet; adding liquid to the container; and pushing and pulling the flexible element from outside the drink container to move the packet within the drink container, with or without a cover engaged to the container.

BRIEF DESCRIPTION OF THE DRAWINGS

The invention is illustrated in the figures of the accompanying drawings which are meant to be exemplary and not limiting, in which like numerals refer to like or corresponding parts, and in which:

FIG. 3 is a vertical section view of the cup, holder and the tea bag/protective jacket/pull tab assembly of FIG. 1 showing the assembly at the bottom of the cup before its protective jacket is removed and before water is added to the cup;

FIG. 4 is a top plan view of the cup, holder and tea bag/protective jacket/pull tab assembly as they are shown in FIG. 3;

FIG. 5 is a vertical section view of part of the cup and of the tea bag with its protective jacket removed, and with water in the cup, showing the tea bag being moved into the holder;

FIG. 6 is a top plan view of the cup and tea bag with the tea bag fully within the holder;

FIG. 12 is a perspective view of a wall section of the holder of FIG. 1 and the tea bag/protective jacket/pull tab assembly of FIG. 1 with the pull tab being passing freely through an opening in the wall section to couple the assembly to the wall section;

FIG. 13 is an exploded perspective view showing the tea bag/protective jacket/pull tab assembly fully coupled to the wall section of FIG. 12 and the wall section about to be placed inside a cup to be bonded therein;

FIG. 14 is a perspective view showing the wall section of FIGS. 12 and 13 bonded to the interior wall of the cup and the tea bag/protective jacket/pull tab assembly adjacent the bottom of the cup;

FIG. 15 is an exploded perspective view of the tea bag of FIG. 1 showing the pull tab separated from the tea bag;

FIG. 16 is a perspective view of the tea bag of FIG. 1 with the pull tab attached to the tea bag and the protective jacket being attached to the tea bag;

FIG. 17 is an enlarged elevation view of the tea bag/protective jacket/pull tab assembly of FIG. 1;

FIG. 18 is an elevation view of the wall section of the holder shown in FIGS. 12 and 13;

FIGS. 19–21 are vertical section views of a die which might stamp in a single operation the wall section with its inward curved portion of the holder shown in FIG. 18, the die being shown in its starting position in FIG. 19, initially contacting the wall section in FIG. 20 and having completely formed the wall section in FIG. 21;

FIG. 22 is an enlarged vertical section view of a portion of the die of FIG. 19 taken at a 90° angle to the view of FIG. 19 showing the scoring blade in its initial FIG. 19 position;

FIG. 23 is an enlarged section view similar to that of FIG. 22 showing the scoring blade in its final FIG. 21 position;

FIGS. 30–33 are views similar to those of FIGS. 1–4, respectively, showing another embodiment of a holder according to the invention in which the wall section of the holder is integral with the sidewall of the cup;

FIG. 34 is an exploded perspective view of a separate holder or insert according to another object of the invention which is engageable with a cup, and showing a tea bag about to be attached to the holder;

FIG. 35 is a partly broken away exploded perspective view of the holder and tea bag of FIG. 34 with the tea bag attached to the holder and the holder being inserted into the cup;

FIG. 36 is a partly broken away perspective view of the holder and cup of FIG. 36 showing the holder engaged with the cup and the tea bag at the bottom of the cup;

FIG. 37 is a horizontal section view of the holder of FIG. 36 with the tea bag therein;

FIG. 38 is an exploded perspective view of a "stringless" tea bag and a tea bag holder having a flexible element or pull tab attached thereto;

FIG. 39 is a perspective view of the tea bag and tea bag holder of FIG. 38 with the holder closed and the tea bag therein;

FIG. 40 is a section view of the tea bag and tea bag holder of FIG. 39 taken along line 40—40 in FIG. 39;

FIG. 41 is a section view of the tea bag and tea bag holder of FIG. 39 taken along line 41—41 in FIG. 40;

FIG. 42 is partly broken away perspective view of a disposable cup and holder according to the embodiment of FIG. 36 but with the tea bag and tea bag holder of FIGS. 38–41;

FIGS. 43–47 show the sequence of making from a blank the single section side wall panel of the cup of FIG. 30 which has integral therewith the wall section of the holder of FIG. 30, also show attaching the tea bag to the holder formed in the blank;

FIGS. 48 and 49 show apparatus which might be used for forming the single section side wall panel shown in FIGS. 43–47 into a frustro-conical sidewall of the cup and connecting the sidewall with a cup bottom;

DESCRIPTION OF THE PREFERRED EMBODIMENTS

Figure 1:
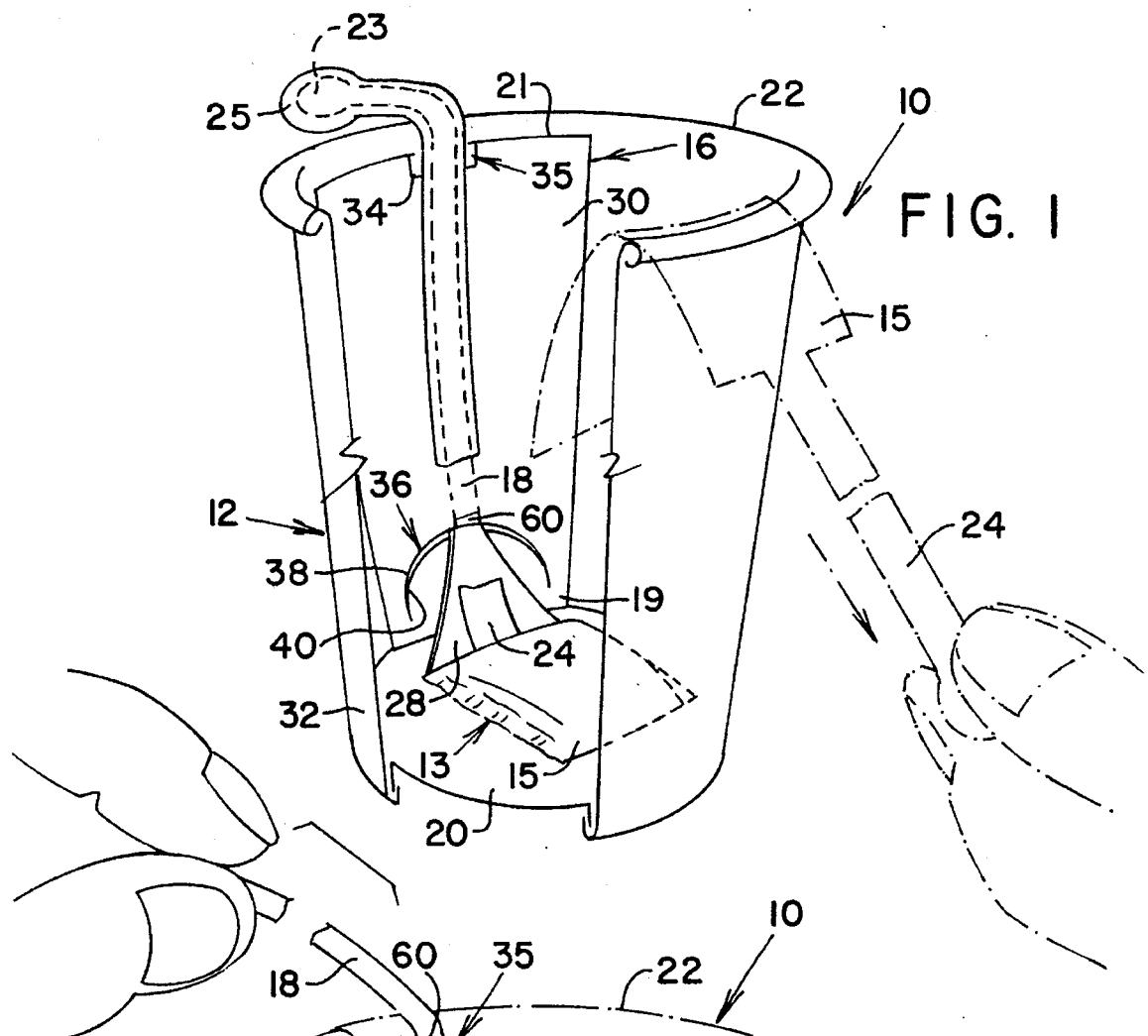
FIG. 1 is a perspective view partly broken away of a disposable cup and a holder into which a tea bag may be moved according to the invention by a flexible element or pull tab attached to the tea bag, the cup being shown without water in it with a tea bag/protective jacket/pull tab assembly at the bottom of the cup, and with the protective jacket shown in solid lines enclosing the tea bag and in broken lines separated from the tea bag.

The presently preferred embodiments of the invention described below and shown in the drawings are various combinations and systems of holders, tea bag/protective jacket/pull tab assemblies, tea bags and disposable cups for brewing single servings of tea. However, the invention may be embodied in various combinations and systems of: drink containers which may be disposable and made from paper and/or plastic (whether molded, made from sheet material or both, or formed in other ways, etc.) or non-disposable (e.g., made from a variety of ceramic coated materials); packets holding various kinds of concentrates which may be non-dissolvable, partially dissolvable or completely dissolvable in various liquids which together may make various drinkable liquid products including beverages and medicines; and holders into which the concentrate packet with or without concentrate therein may be moved from within the drink container after the liquid product has been made, and which holders may be permanently attached to the drink container during or after manufacture of the drink container or which may be engaged with the drink container either removably, semi-permanently or permanently at any desired time. Also, the systems and holders of the invention may use standard or custom-formed packets as well as tea bags of different sizes and shapes.

Figure 2:
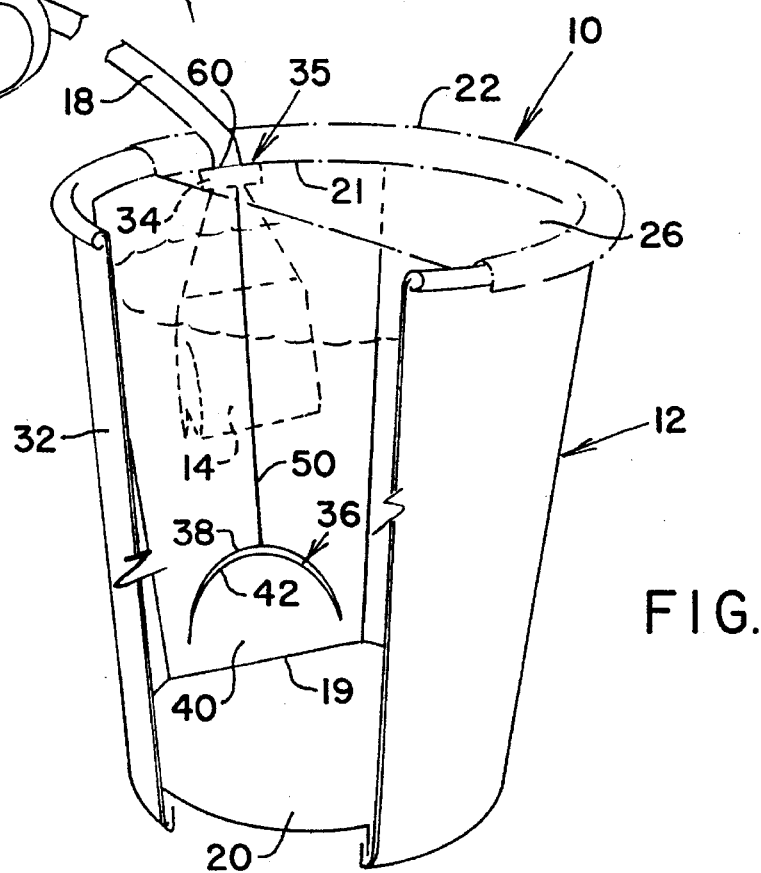
FIG. 2 is a partly broken away perspective view of the disposable cup and holder similar to the view of FIG. 1, but closed by a cover and showing the tea bag withdrawn into the holder and the pull tab being severed from the tea bag.
Figure 9:
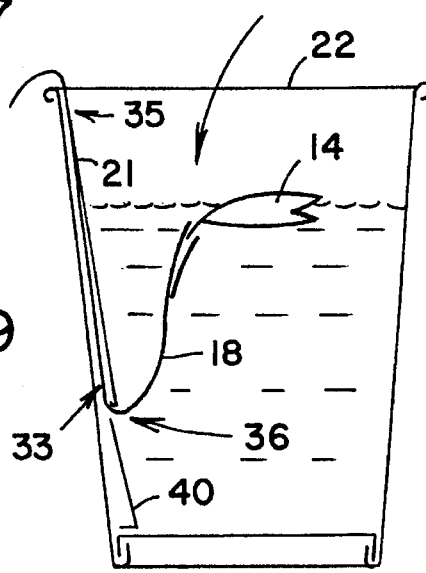

Referring to FIG. 1, a system 10 for making a drinkable liquid product, specifically tea, comprises a disposable cup 12, a tea bag/protective jacket/pull tab assembly 13 (which includes a tea bag 14) and a used packet (tea bag) holder 16. The tea bag 14 has a flexible element or pull tab 18 attached to the tea bag and extending into and through holder 16. The pull tab 18 enters holder 16 at the bottom 19 thereof adjacent the bottom 20 of the cup 12 and exits the holder 16 at the top 21 thereof adjacent the top 22 of the cup 12. The pull tab 18 movably attaches the tea bag 14 to the cup 12. The pull tab 18 is long enough to allow the tea bag 14 to rest on the bottom 20 of the cup while the end 23 thereof extends sufficiently out of cup 12 to allow the tea bag to float to the top of the cup when water is added thereto (FIG. 9) while the end 23 remains sufficiently out of the cup to be grasped. As shown in FIGS. 1 and 2, the optimum length of the pull tab 18 places its end 25 approximately at the opening 35 with some or no slack of the pull tab in compartment 33 (FIG. 3). Preferably there is little or no slack of the pull tab 18 in the cup 12 outside of the compartment 33 so that the tea bag assembly 13 is maintained at the bottom of the cup. This placement of the end 23 of pull tab 18 close to top opening 35 serves two purposes. One is that the end 23, which has a bulbous shape stops the pull tab from being withdrawn into the holder through the second opening, and the other allows the pull tab 18 to be moved back and forth as shown by the arrows in FIG. 10 to assist in the infusion of tea from the tea bag into the water. For a 12 ounce cup, the pull tab 18 is approximately six inches long.

The tea bag 14 is enclosed in an easily opened protective jacket 15, which has a flexible element or pull tab 24 attached thereto by means of which the jacket 15 is opened and removed from the cup. The pull tab 24 is long enough so that its end 25 projects sufficiently from the top of cup 12 so that it may be grasped while the tea bag rests on the bottom of the cup. The ends 23 and 25 of pull tabs 18 and 24 are conveniently removably held together as shown in FIG. 1.

Figure 8:
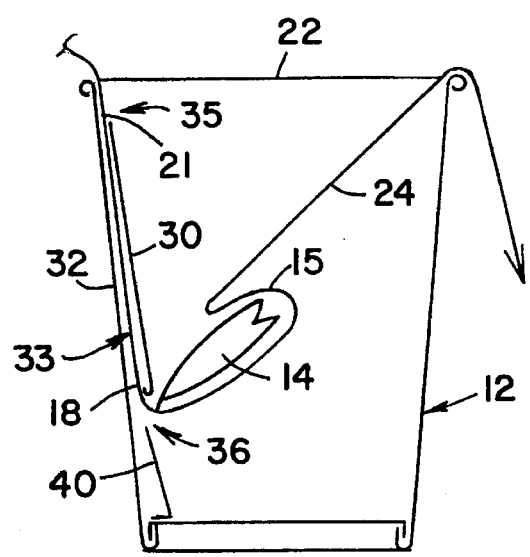

Referring to FIGS. 1 and 2, a single serving of tea may be brewed in cup 12 and the tea bag 14 thereafter withdrawn into holder 16 as follows: The ends 23 and 25 of the pull tabs 18 and 24 are separated, and while the end 23 is held urging the tea bag assembly 13 against opening 36, end 25 of pull tab 24 is pulled to open the jacket 15 and remove it from the cup as shown in broken lines in FIG. 1. The pull tab end 23 may be held against the outside of the cup with the hand holding the cup while the opposite hood pulls the pull tab 24. Holding the end 23 of pull tab 18 such that the tea bag assembly is urged against the opening 36 allows the jacket 15 to be opened and removed by a simple upward movement of the end 25 of the pull tab 24 as shown in FIG. 8. After the hot water is added to cup 12, a cover 26 is engaged with the top of the cup (FIG. 2) and the tea is allowed to brew to the desired strength. Then, the end 23 of pull tab 18 is pulled to withdraw the tea bag 14 into holder 16 as shown in FIG. 2. As described in more detail below, this effectively stops brewing of the tea and effectively isolates the tea bag 14 from the drinking area of the cup. Little or no tea is brewed within holder 16, and little or none of any additional tea which may be brewed in holder 16 moves therefrom into cup 12 with normal handling of the cup.

The cup 12 may be a conventional (except for holder 16) 8–16 ounce, single wrap paper cup of conventional two-piece construction, as manufactured, for example, by Sweetheart of Chicago, Ill. The tea bag 14 or packet as shown in FIG. 2, without the protective jacket 15 and without the pull tab 18 may be any company's conventional tea bag, and as shown in the drawings is of the flow through type.

The pull tab 18 attached to an end of the tea bag 14 replaces the string usually attached to conventional tea bags. Pull tab 18 is an elongated flexible strip which is attached at one end to tea bag 14 through a tapered transition region 28 which increases in width from the narrower width of the flexible strip to the wider width of the tea bag. The transition region 28 is provided for reasons discussed below and is preferably triangular in shape for reasons discussed below.

The pull tab 24 attached to the protective jacket 15 also is an elongated flexible strip and is used to open the jacket and separate it from the tea bag 14, as indicated above. Jacket 15 may be sealed over its full 360° coverage of the tea bag, and may be impermeable to air and water, for example, made of a metal foil or plastic film, or a laminate which protects the tea bag against contamination as well as maintains product freshness, or it may simply be made of an air and/or water porous material such as paper which primarily protects the tea bag from contamination and to a limited extent maintains product freshness. Whether made of a foil, plastic, laminate or paper, jacket 15 is joined along its periphery to enclose tea bag 14 so that the jacket opens easily when pull tab 24 is pulled. Preferably, jacket 15 is air-tight. Pull tab 24 is preferably made from the same material as jacket 15 so that the jacket and pull tab may be integrally formed as one piece. For example, the jacket and pull tab may be plastic, paper or foil.

The cup 12 typically has an open circular top 22, a circular bottom 20 and a generally frusto-conical sidewall 30 extending upwardly from the bottom, the sidewall wrapped around itself and adhesively bonded. The cup may be fabricated from a semi-rigid, non-absorbent, water-repellant, heat-insulating material such as paper of a known type conventionally used in the art for such purposes which is coated on one or both sides with a thin film of thermoplastic. The advantage of the thermoplastic coating is that it can withstand extremes of temperatures and usage and may be melted at desired locations to act as an adhesive for heat-fused bonding of different parts of the cup. The cup 12 may be manufactured by known machines for manufacturing two-piece paper cups coated on one or both sides with a film of thermoplastic material and which have fused seams. Cup 12 may also be made of plastic by any suitable process, e.g., molded in one piece or fabricated from sheet material and/or molded pieces. Cup 12 may have different shapes. For example, cup 12 may be conical and used with a cup holder.

The holder 16 comprises a wall section 30 which has a width substantially less than the circumference of the sidewall 32 of cup 12 and a height which is slightly less than the height of sidewall 32. The wall section 30 is engaged with the cup 12 as follows. The periphery of wall section 30 is bonded to the interior of the sidewall 32 at 31 (FIG. 4) with the central or inward region of the wall section 30 spaced from the cup sidewall 32 to form a compartment 33 (FIG. 3) defined by a portion of the cup sidewall 32 and the wall section 30. The periphery of wall section 30 is continuously bonded to cup sidewall 32 except for a small area at the top 21 of wall section 30 below a notch or cutout 34 thereof in the top edge 21 of wall section 30 at the center. The bonding thus comprises the engaging means referred to herein. The particular bonding method may be conventional, e.g., the heat bonding described above of a wall section having a thermoplastic coating. Preferably, the volume of compartment 33 is relatively small, for example, less than about 15% and preferably about 5% of the volume of cup 12. The unbonded region below cut-out 34 defines the opening 35 (second opening) out of holder 16. Another opening 36 (first opening) into holder 16 is provided in wall section 30 near the bottom 19 thereof. The shape of opening 36 is wider at the bottom to allow the wide, wet tea bag to enter and smaller at the top to capture the tea bag in the compartment 33. Also, the opening is preferably narrower at the top to assist in maintaining alignment of the pull tab 18 as it is moved back and forth relative to holder 16. For example, the opening 36 is defined by a curved cut 38 extending in wall section 30 for a portion of a circle, e.g., a semi-circle, and a hinged door 40 formed by the wall section immediately below the cut 38. Cut 38 may have other shapes, but an arc of a circle or ellipse is presently preferred, e.g., a 30° arc of an ellipse.

The top 21 of holder 16 terminates below the top 22 of cup 12 so that the continuity of the curled top 22 is maintained smooth, and is not interrupted by the discontinuity of the top of holder 16 which would be felt when sipping the tea. Also, since cup 12 receives a cover 26, there would be a tendency for the tea or water to leak at the discontinuity when the cup is being carried. Further, cup 12 has a seam (not shown) where the ends of the sidewall 32 overlap and are joined. That seam extends to the top 22 of the cup 12 and results in a double wall thickness region and a discontinuity. If the top 21 of holder 16 were to overlap that seam, there would be a triple wall thickness above the seam, which may worsen the risk of leakage past the cover. Where possible in other embodiments, the top of the holder also terminates below the top of the cup. For example, see FIGS. 24 and 30. Additionally, the long sides of side wall section 30 not bonded to cup sidewall 32 along the seam thereof so as not to provide an undesirable triple wall thickness region.

The edge 42 (FIG. 3) of cut 38 is turned in towards cup 32 sidewall to facilitate movement of tea bag 14 into and through opening 36. The in-turned edge 42 allows the transition region 28 of the pull tab 24 and the tea bag 14 to slide past the opening 36 without catching on the edge of the opening. The edge 44 of the bottom 19 of wall section 30 is turned in towards the sidewall 32 of the cup, and this in-turned edge 44 is bonded to the bottom 20 of cup 12. The in-turned edge 44 allows the wall section 30 to be flexed or gently bent into a curve to follow the curvature of the cup sidewall 32 while providing a continuous surface without gaps at the bottom 19 of the wall section 30 to be bonded to the cup bottom 20.

Referring to FIG. 3, wall section 30 is spaced slightly away from the cup sidewall 32 in the central region of the wall section to define the compartment 33 (FIG. 4) which receives the used tea bag 14 therein as shown in FIG. 6. Wall section 30 has a pre-weakened portion in the form of a score or fold line 50 (FIGS. 2, 12 and 18) which facilitates bending or flexing of the wall section 30 to expand the compartment 33 when the used tea bag 14 enters the compartment 33. The in-turned bottom edge 44 of wall section 30 is sized to space the bottom 19 of wall section 30 from the cup sidewall 30. The spacing is such to allow relatively easy entry of the used tea bag 14 through opening 36 into the compartment 33 formed by the wall section 32 and the cup sidewall 30. The top edge 21 of wall section 30 is bonded directly to the cup sidewall without a space. As a result, the size of the compartment 33 between wall section 30 and cup sidewall 32 is tapered, being larger at the bottom of wall section 30 and cup bottom 20, and progressively becoming smaller with height of the wall section 30.

This tapered configuration of compartment 33 allows easy entry of the used tea bag therein at opening 36, but then progressively squeezes the tea bag 14 as it is progressively pulled upwardly into compartment 33. Squeezing the tea bag 14 compresses the tea leaves therein so that the flow of liquid through the tea leaves is restricted, much like the flow of water through a compressed sponge would be. This action, alone and in combination with other factors, effectively stops the brewing of the tea beverage when the tea bag 14 is withdrawn high into compartment 33. Other factors which contribute to the cessation of brewing are the following: the compartment 33 is completely sealed below the water line in cup 12 except for opening 36, which restricts the flow of liquid into and out of compartment 33; the opening 36 is relatively small since the hinged door 40 and the in-turned edge 42 restrict its size; after some of the tea has been sipped, the tea bag 13 in the compartment 33 is above the water line in the cup, so that infusion of the tea stops; and after the desired amount of tea has infused from the tea bag into the water, the tea bag is to a certain degree "spent", so that continued flow of liquid through the tea bag yields only a small percentage of the tea's brewed original potency.

A more detailed description follows of brewing a single serving of tea in accordance with the invention using the disposable system 10. System 10 is supplied as shown in FIG. 1 to deli's, fast food restaurants, cafeterias, etc., or sold in general stores for home or business use, etc. The tea bag assembly 13 is resting on the bottom of the cup with the tea bag 14 enclosed in its protective jacket 15 so that the tea bag is protected from contamination and its freshness is maintained while in storage waiting to be used. This level of freshness protection equals that of current individually wrapped tea bags in a multi-pack carton, assuming that the tea bags are comparably wrapped. The pull tab attached to the tea bag 14 extends into the compartment 33 of the holder 16 through opening 36 and projects from the compartment 33 through opening 35 freely movable relative to the cup 12. The pull tab 24 attached to jacket 15 extends upwardly along the outer surface of wall section 30 of holder 16 over the central longitudinal axis thereof, and terminates in end 25 which is co-located with the end 23 of pull tab 18. The ends 23 and 25 are adhesively joined to keep the projecting parts of the two pull tabs together. This also results in a neat looking system. If desired, pull tab 24 may also be bonded to wall section 30 by an edible adhesive (e.g. starch) to hold it in place within cup 12 and to maintain the tea bag packet 13 at the bottom of the cup.

At this point (FIG. 7), one manually separates the two pull tabs 18 and 24 from each other, holds the end 23 of the pull tab 18 against the outside of the cup simply by holding the cup with one hand and the end 23 between a finger and the cup sidewall, and pulls with the other hand on the end 25 of pull tab 24. Continued pulling on the pull tab 18 first opens the jacket 15 (FIG. 8) and then separates the jacket from the tea bag (broken line position in FIG. 1). Next water is added to cup 12 (FIG. 9) which causes the tea bag 12 to float to the top of the cup. One may now assist the infusion of tea from the tea bag by moving the tea bag through the water by pulling and pushing the pull tab 18. The pull tab 18 is preferably somewhat stiff and for that reason and other reasons described below permits the tea bag to be pushed as well as pushed in the water. This infusing or steeping action is similar to the action by which one brews tea in a cup with a conventional tea bag attached to a string and/or using a spoon to swirl or bob the tea bag in the cup.

In order to perform the functions described above, pull tab 18 is constructed to be as thin as possible and yet robust and to slide easily through openings 35 and 36. For example the pull tab 18 maybe made from a thin, strong strip of a flexible, semi-rigid, non-absorbent, water-repellant material such as paper coated on both sides with a thin film of thermoplastic, or from plastic. Such coated paper is conventionally used in the manufacture of hot-drink paper cups. The pull tab 18 may be made from the same material as cup 12, but of double ply. Suitably configuring openings 35 and 36 also improves the sliding action of pull tab 18. For example, opening 35 is just slightly larger than the pull tab 18 and rectangularly shaped similar to the shape of the pull tab strip to help maintain the pull tab alignment in the opening 35. Also, the in-turned edge 42 at opening 36 eliminates a sharp edge at opening 26 and helps the spent tea bag from getting caught on the opening edge. Also, the transition region 28 which connects the pull tab 18 to the tea bag 14 helps maintain alignment of the pull tab and the tea bag as they are pulled into and through compartment 33. Further, opening 35 and transition region 28 are shaped so that the transition region 28 becomes wedged in the opening 35 when the pull tab is forcefully pulled its full length out of the cup.

Figure 10:
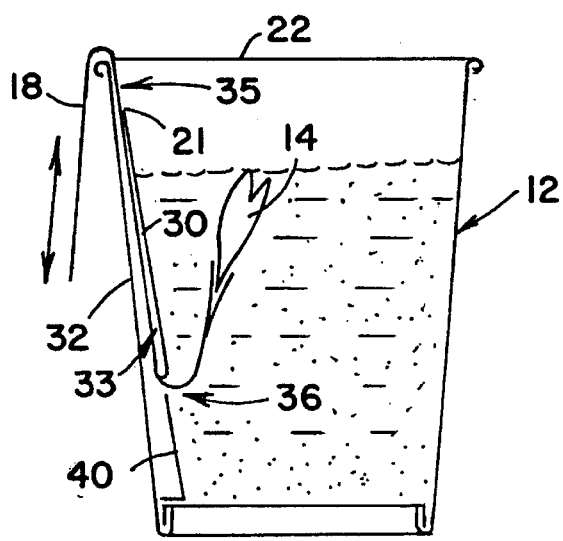
Figure 11:
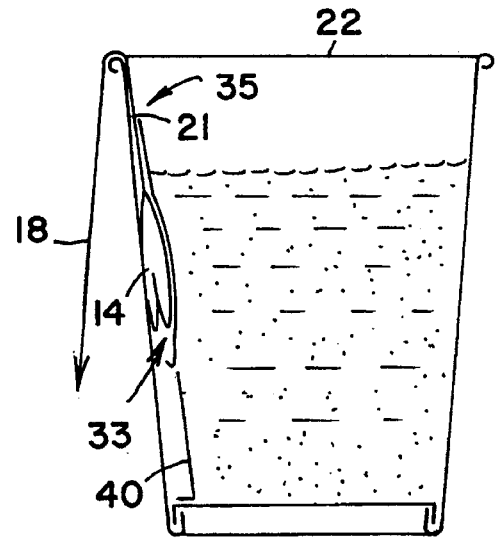
Figure 20:
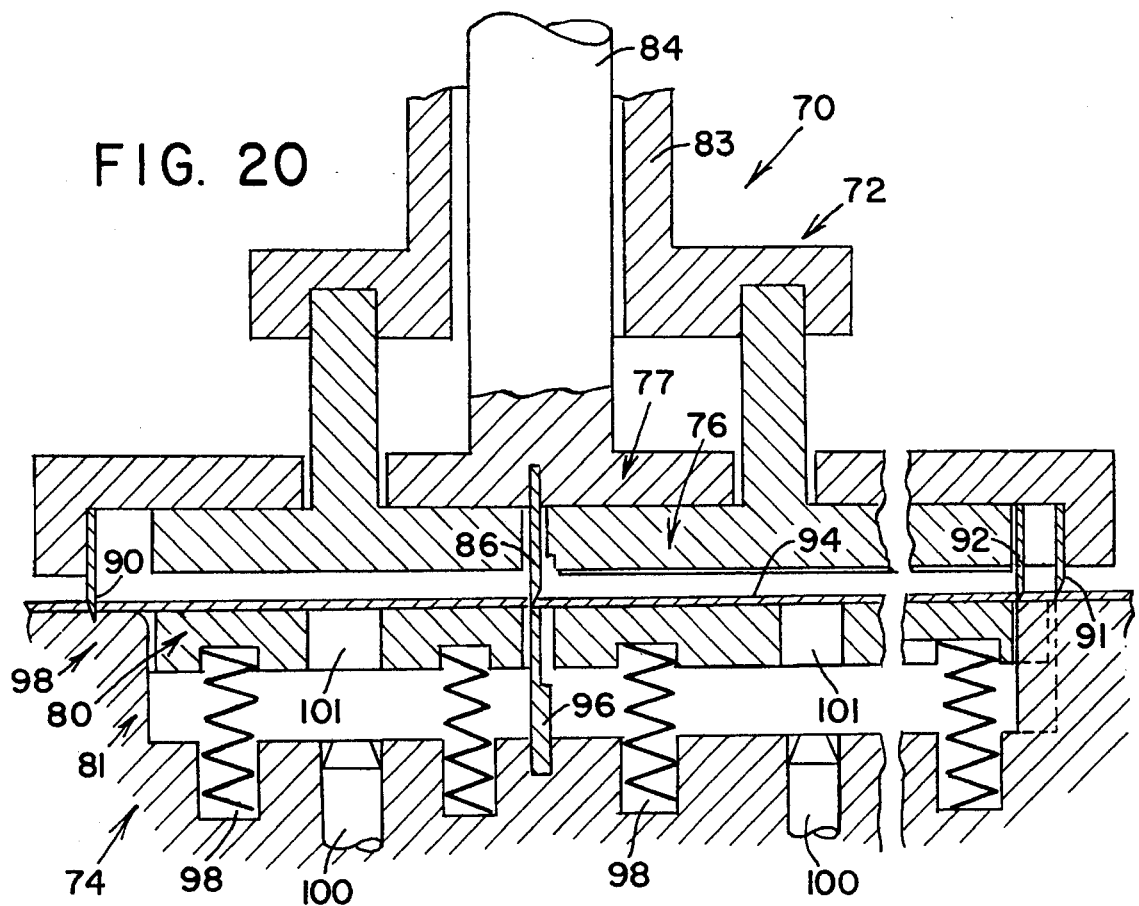

When the tea has been brewed to the desired strength, one pulls the pull tab through the compartment 33 until the tea bag becomes lodged at the top of the compartment (FIGS. 6 and 11). Referring to FIGS. 10 and 11, the tea bag will typically undergo a turn of from about 180° to almost 360° from the floating position of the tea bag in FIG. 10 to its final position within compartment 33. The system permits such turns of the tea bag without it becoming caught on the edges of opening 36 because the pull tab 18 is made relatively smooth, opening 36 has the in-turned edge 42 and because the hot water in the cup softens the hinged door 40 and the edges of opening 36.

The compartment 33 is somewhat narrower than the thickness of the tea bag 14 so that the tea bag has to be forced along the compartment until it becomes wedged therein near the top thereof. As a result, the compartment 33 bulges (FIGS. 6 and 11) as the used tea bag is forced up into the compartment 33. The wall section 30 includes a score line 50 therein (FIG. 2) which facilitates the bulging action just described. The hot water in cup 12 also helps prevent tearing of the pull tab 18 and of surfaces it comes into contact with. The tapered transition region 28 between the pull tab 18 and the tea bag 13 becomes wedged into the top opening 35 of holder 16 when the tea bag 13 is forced to the top of the compartment 33. This wedging action of the pull tab 18 in opening 35 and the fact that the compartment is narrower than the tea bag 14 securely lodge the tea bag in the top of compartment 33 so that it will not fall back down into the lower portion of the compartment where more tea could be infused into the liquid from the tea bag.

Movement and wedging of the tea bag 14 into the upper part of compartment 33 effectively stops brewing as described above. The tea may now be allowed to sit, or may be carried, etc. until one is ready to drink it without removing the tea bag from the cup and without the tea continuing to brew. The pull tab 18 for the tea bag may include a pre-weakened portion adjacent the transition region 28 in the form of a score or perforation 60 or a notch, etc., which allows the pull tab to easily be severed thereat.

As described above, the tapered transition region 28 between the pull tab 18 and the tea bag 14 becomes wedged into the top opening 35 of holder 16 when the tea bag 14 is forced to the top of the compartment 33. Locating the score 60 closely adjacent the tea bag ensures that the severed end of the pull tab remaining in the cup with the wedged transition region in opening 35 is below the top edge of the cup, so that the pull tab will not interfere with drinking the tea or sealing the cover on the cup. The score 60 is also located closely adjacent the tea bag so that it is wetted during brewing of the tea, which weakens that area and facilitates severing the pull tab along the score 60. The end 23 never touches water so the pull tab 18 separates from the cup without any wetness touching the user. Also, one may separate the pull tab 18 from the cup and not have to cope with the inconvenience of the pull tab dangling from the cup while drinking the tea or carrying the cup.

In accordance with the invention, the entire foregoing procedure may be carried out with the cover 26 off the cup, or with the cover 26 engaged with the cup after the water has been added to the cup. Thus, the tea may be brewed and the tea bag withdrawn into compartment 33 while the cover 26 is engaged with the cup 12. One may now brew the tea and stop the brewing without removing the cover from the cup, and may do so well before one is ready to drink the tea and while carrying the cup, etc.

In accordance with the invention, after one finishes drinking the tea or otherwise decides to discard the cup 12, all that he has to do is throw the entire system away without ever having to directly handle the wet tea bag 14. Thus, one never has to touch the tea bag, before, during or after the tea is brewed, and the system 10 may be discarded as a unit.

FIGS. 12–14 show the sequence for mounting the tea bag assembly 13 to the wall section 30 of the holder 16, and then inserting the wall section 16 with the tea bag assembly 13 coupled thereto into cup 12 where it is bonded to the sidewall 32 of the cup. First, as shown in FIG. 12, the end 23 of the element 18 is pulled through opening 36 onto what will be the interior surface of wall section 30 when it is bonded to the cup. Then, the pull tab is pulled until the transition region 28 of the pull tab 18 reaches opening 36 (FIG. 13). Next, as shown in FIG. 14, the wall section 30 with the tea bag assembly 33 in the condition of FIG. 13 is moved into the interior of cup 12 until the in-turned bottom edge 44 of wall section 30 contacts the bottom 20 of the cup. The wall section 30 is then bonded along its periphery (speckled area as described in FIG. 14) above to the sidewall 32 of cup 12. Then, the flexible ends 23 and 25 of pull tabs 18 and 24 are adhered together to provide the system shown in FIG. 1 with the tea bag assembly 13 resting on the cup bottom 20 and the pull tab ends 23 and 25 draped over the top edge 22 of the cup. The cups are then nested in conventional fashion and packaged in conventional fashion. As compared to the stacking or nesting of conventional cups without a holder 12 and tea bag assembly 33, which may be referenced as a 1:1 stacking factor, the stacking factor for system 10 in accordance with the invention is about 2:1 to 3:1 (i.e., takes up two to three times more space for the same number of cups without the tea bag assembly and holder). Such a stacking factor is made possible by maintaining the tea bag assembly at the bottom 20 of the cup 12 and by making compartment 33 relatively thin.

FIGS. 15–17 show the manner of assembling the tea bag assembly 13. A conventional flow-through tea bag 14 without a string attached thereto is attached to pull tab 18 as shown in FIG. 15. The pull tab transition region 28 comprises a triangular end section 28a attached to pull tab 18 and a separate matching triangular end section 28b. The top end 65 of the tea bag 14, which is tapered, is sandwiched between transition sections 28a and 28b which are adhered together and to the top end 65 of tea bag 14 by an edible adhesive. Then, the jacket 15 is attached to the tea bag as follows. Jacket 15 is a single sheet of material (foil, plastic, laminate, paper, etc.) which houses the tea bag between sides 15a, 15b thereof and has the pull tab 24 attached to the end of side 15a of the sheet. The tea bag 14 is positioned centered on side 15a and the other side 15b of the sheet is folded in the direction of the arrow onto the tea bag 14 to enclose it. The peripheries of the two sides 14a and 14b are attached conventionally by any bonding or attaching method suitable for the particular material of the jacket 15, for example, being crimped as shown in FIG. 17, or heat sealed, glued, ultrasonically bonded, etc., or attached in any suitable way either air tight or not. Also, the peripheries of jacket sections 15a and 15b which enclose the transition region 28 may be bonded or attached thereto as well, depending on the degree to which it is desired to seal the tea bag 14. The resulting tea bag assembly 13 is depicted in FIG. 17.

Figure 7:
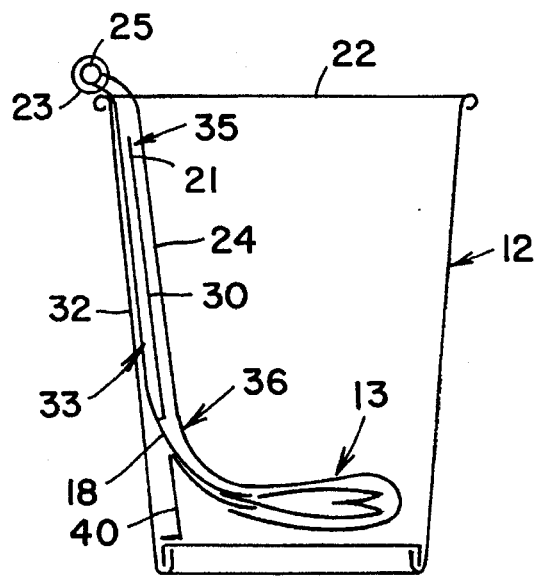
FIGS. 7–11 are vertical section views of the cup and the tea bag/protective jacket/pull tab assembly or the tea bag illustrating the sequence for removing the protective jacket from the tea bag, brewing the tea and withdrawing the tea bag into the holder.

System 10 (FIG. 1) uses a custom tea bag assembly 13, but may use a standard tea bag 14b (FIG. 7). However, use of a standard tea bag 14b is not presently preferred because it is probably more difficult to thread a thin string into compartment 33 compared to the pull tab strip 18, and there are the risks that the narrow string may cut into surfaces of the holder 16 and cup 12 and may disconnect from the tea bag while the tea bag is being pulled through opening 36. Also, it is not possible to achieve the infusing action achieved with the pull tab strip 18 because the string can only be pulled and cannot be pushed into the compartment. Other embodiments of the invention described below employ a standard tea bag 14b.

Figure 21:
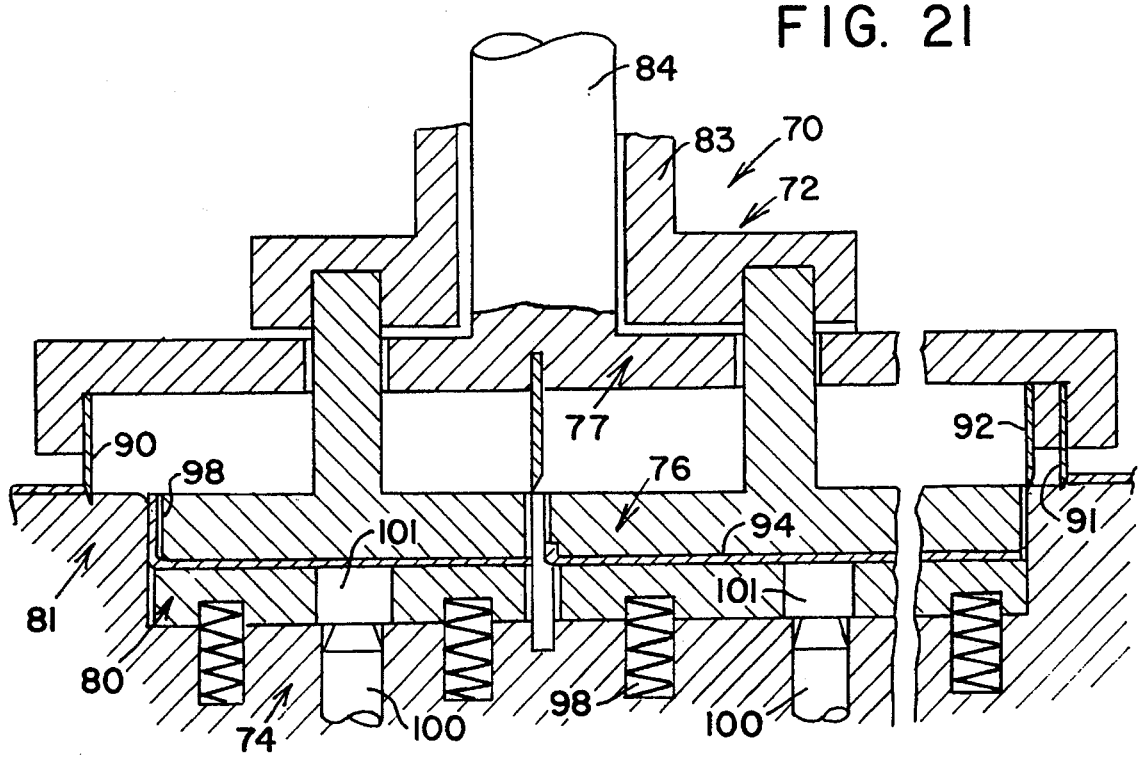

FIGS. 19–23 show the apparatus 70 that might be used for stamping the holder wall section 30 shown in FIG. 18. The die apparatus 70 comprises a movable die half 72 and a stationary die half 74. The movable die half 72 includes two relatively movable die sections 76 and 77, and the stationary die half 74 includes two relatively movable die sections 80 and 81. Die 76 of upper die half 72 is attached to a driven hollow tube 83, and die section 77 of upper die half 72 is attached to a driven shaft 84 which is concentrically movably mounted within hollow tube 84. Tube 83 and shaft 84 may be independently driven by conventional means, not shown. Die section 76 has attached thereto cutting blade 86, which cuts opening 36 in wall section 30. Blade 86 is curved and extends in section of a circle or ellipse. A linear scoring blade 88 is also attached to die section positioned parallel to a radius of blade 86. Die section 77 has five blades attached thereto, only three 90–92 of which are shown. Blade 90 is curved and cuts a blank 94 at one end thereof to form the bottom edge 44 of the wall section 30. Blade 91 is linear and cuts the blank 94 to form the upper edge 21 of the wall section 30. Blade 92 is three-sided to form the cut-out 34 in the top edge 21 of the wall section 30. Two other blades, not shown, cut the blank 94 to form the sides of the wall section 30. An anvil 96 is flexibly mounted to die section 81 of die half 81, and cooperates with blade 86 to cut opening 36 and then bend edge 42 of opening 36 as shown in FIGS. 21 and 22. The die section 80 is supported by springs 98 on die section 81 and may be moved against die section 81 as shown in FIG. 22.

The wall section 30 is formed from a blank 94 by die 72 as follows. A blank 94 is inserted on the top of lower die section 80 extending to lower die section 81, as shown in FIG. 19. Upper die sections 76 and 77 are moved together to the position shown in FIG. 20 with blades 90, 91 and 92 and the two blades not shown cutting wall section 30 to define its periphery as shown in FIG. 18. At this point, blade 86 and anvil 96 have cooperated to cut opening 36. Thereafter, upper die section 76 is moved relative to upper die section 77 and lower die section 81, to move the wall section 30 which has been severed from the blank 94 and the lower die section 82 to the positions shown in FIG. 21. The movement of upper die section 76 and lower die section 80 relative to lower die section 81 cause the in-turned edge 42 to opening 36 to be bent by blade 86 and anvil 96 and the in-turned bottom edge 44 to be formed in the space 98 between the outer edge of die section 80 and the inner edge of die section 81. Also, as die section 80 reaches its FIG. 21 position, blade 88 scores wall section 30 to form score line 50 as shown in FIGS. 22 and 23. The formed blank 30 is removed from die 74 by retracting die sections 76 and 77 and activating pushers 100 which enter holes 101 and push the formed wall section 30 off the top die section 82.

A die apparatus 72 (FIG. 19) and a method have been described above for making the wall section 30 (FIG. 18) of the holder 16 of FIG. 1. The wall section 30 may of course be made in other ways, as will be known by those having skill in the relevant art(s).

Figure 26:
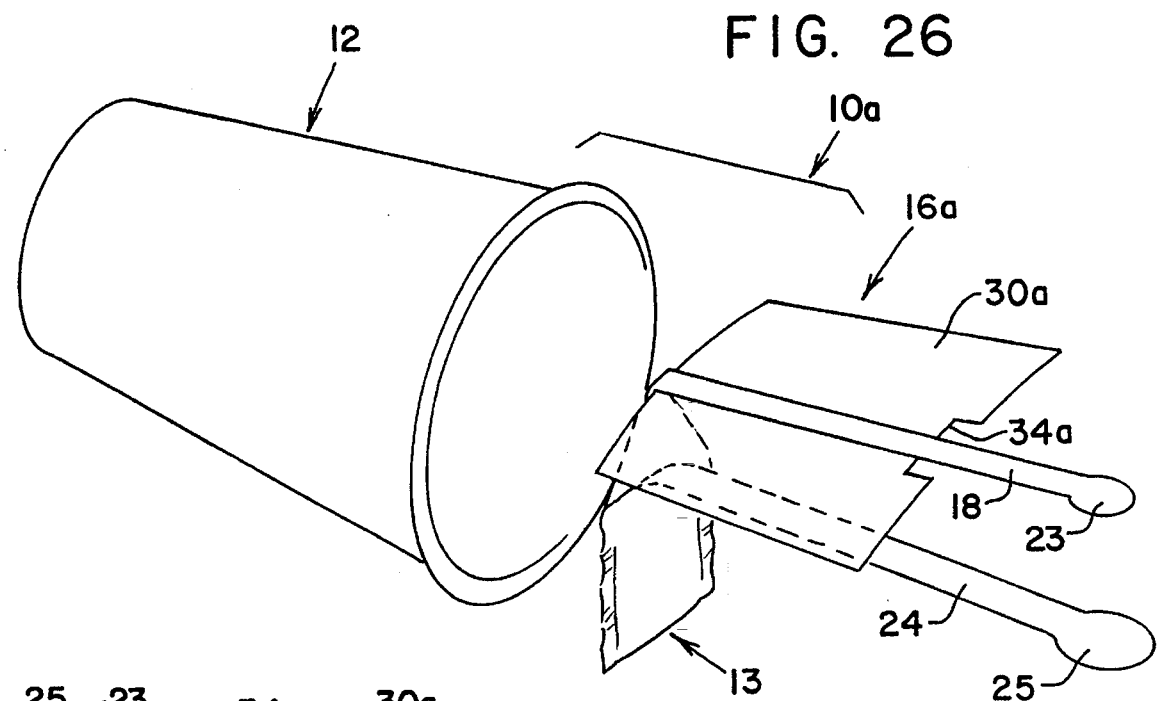
FIG. 26 is an exploded perspective view showing the tea bag/protective jacket/pull tab assembly fully coupled to the wall section of the holder of FIG. 25 and the wall section about to be placed inside a cup to be bonded therein.
Figure 24:
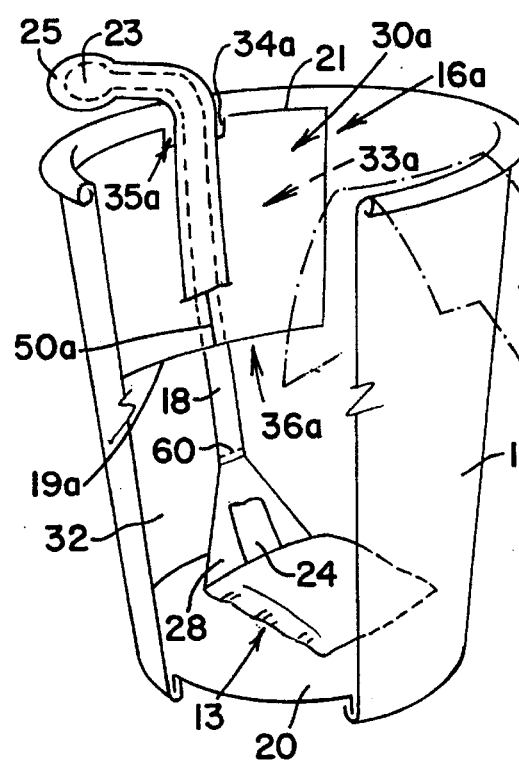
FIG. 24 is a partly broken away perspective view similar to that of FIG. 1 of a disposable cup and a holder according to another embodiment of the invention with the tea bag/protective jacket/pull tab assembly of FIG. 1, in which the holder extends for only part of the side wall of the cup as opposed to substantially the full length of the side wall as shown in FIG. 1.
Figure 25:
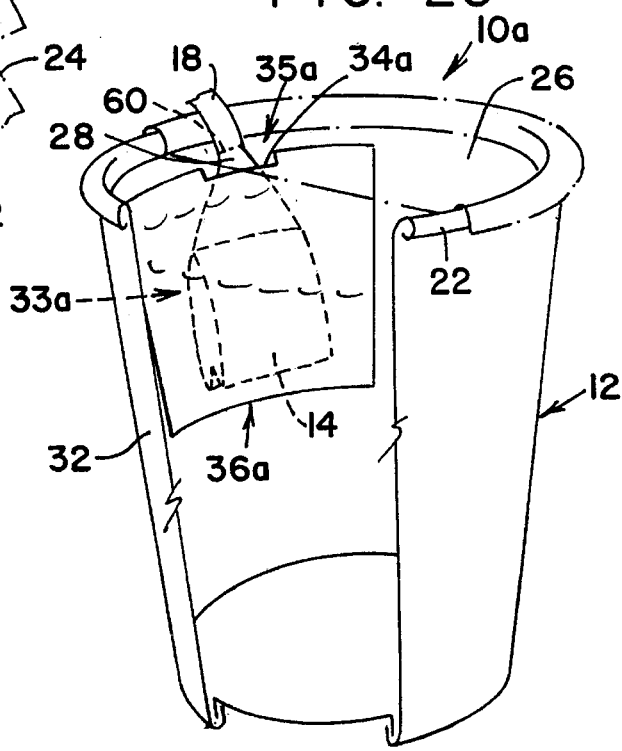
FIG. 25 is a partly broken away perspective view of the disposable cup and holder similar to the view of FIG. 24, but closed by a cover and showing the tea bag withdrawn into the holder and the pull tab being severed from the tea bag.

FIGS. 24–26 illustrate another embodiment of a single serving, disposable tea brewing system 10a according to the inventor. System 10a is composed of a cup 12 and a tea bag assembly 13 as described for system 10, and a modified holder 16a. Holder 16a comprises a wall section 30a which is the same as the upper half of wall section 30, i.e., has the same top edge 21 and cut-out 34, but is mounted below the lip of the cup and does not include the cut opening 36 and the un-turned lower edge 44 of wall section 30. The length of wall section 30a is shown to be approximately half of wall section 30, but may be more, but not so short as not to fit the used tea bag 14 (FIG. 25) between the wall section 30a and the cup sidewall 32. Wall section 30a when bonded along its peripheries to the cup sidewall 32 forms compartment 33a into which the used tea bag 14 may be withdrawn. The lower peripheral edge 19a is not bonded to the cup sidewall 32 so as to form one opening 36a into compartment 33a. Wall section 30a includes the central score line 50a and when bonded to cup sidewall 32a is flexed to space the central part of wall section 30a from sidewall 32 to thereby form compartment 33a. The top edge 21 of wall section 30a is bonded to cup sidewall 32 without a space, as described for system 10. Compartment 33a therefore is somewhat tapered, similar to compartment 33 of system 10.

As shown in FIG. 24, system 10a as provided to a user has the tea bag assembly 13 resting on the cup bottom 20, with pull tab 18 passing through opening 36a into compartment 33a and out of opening 35. Pull tab 24 extends along the cup sidewall 32 and over the wall section 30a, and the ends 23 and 25 of the pull tabs are adhered together. System 10a operates generally as described for system 10, as illustrated by FIGS. 24 and 25, and provides all of the benefits and advantages described above for system 10, as illustrated in FIG. 26, except that there may be more seepage of infused tea through opening 36a than through opening 36. System 10a has the advantage that it is easier to assemble than system 10 because it is easier to bond the shorter wall section 30a to the cup sidewall 32 and the pull tab 18 need not be threaded through the opening 36, but simply as placed on the interior side of the wall section 30a. While wall section 30a is shown bonded to the cup sidewall along the top and side edges, it may be bonded only along the top edge, or along the top edge and only part of the side edges.

The holder 16a will still be effective as long as it securely holds the tea bag 14 at the top of the cup, as shown in FIG. 25.

The wall section 30a (FIG. 26) may be made in a manner similar to that described for wall section 30, or in other ways, as will be known by those having skill in the relevant art(s).

Figure 28:
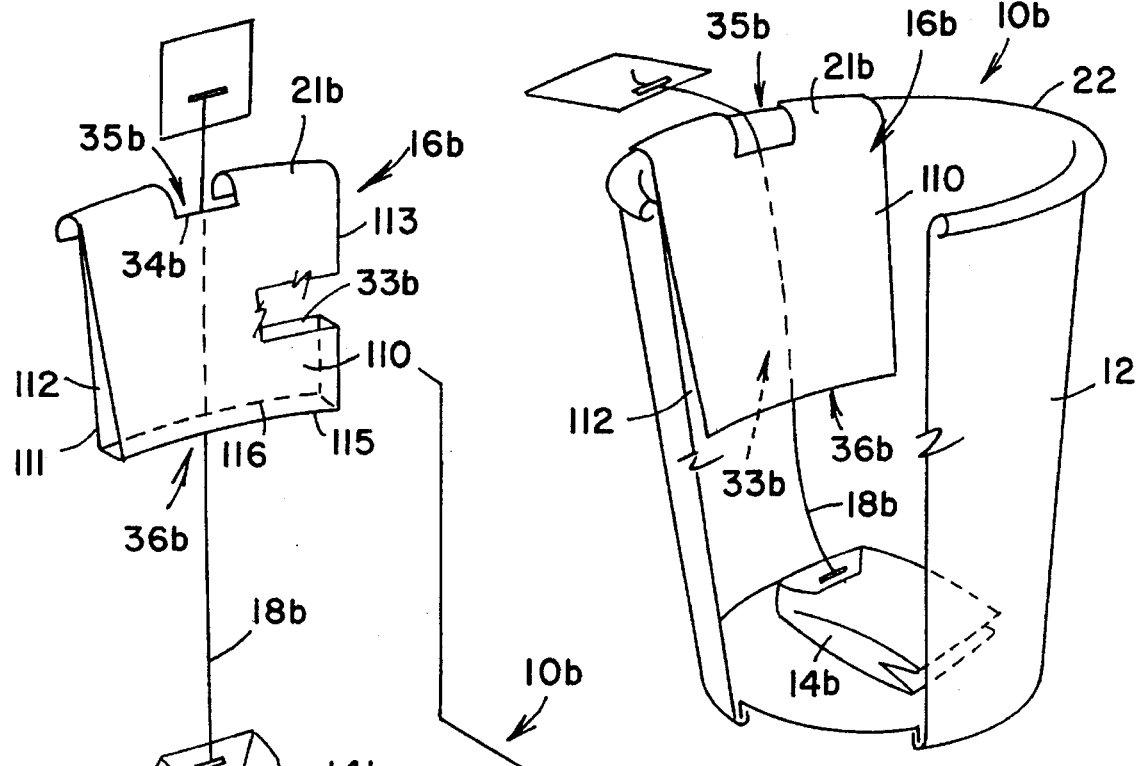
FIG. 28 is a partly broken away perspective view of the holder and cup of FIG. 27 showing the holder engaged with the cup and the tea bag at the bottom of the cup.
Figure 27:
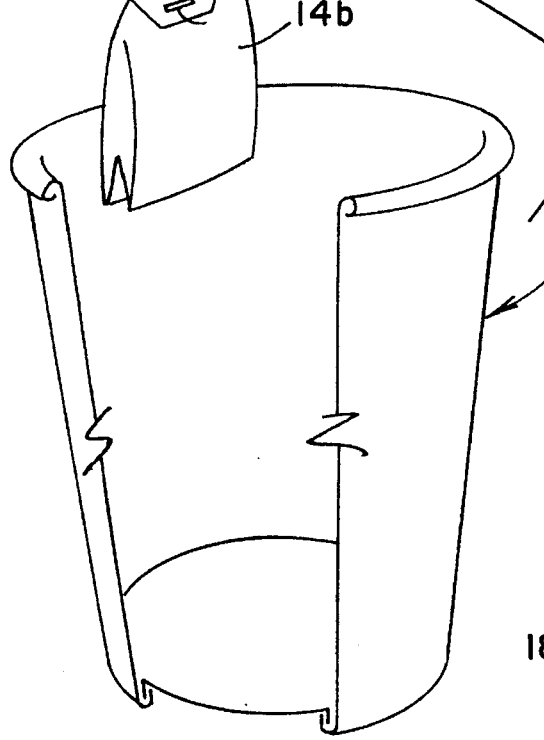
FIG. 27 is a partly broken away, exploded perspective view of a disposable cup and a separate holder in the form of an insert according to another embodiment of the invention, with a standard tea bag attached to the holder which is about to be removably engaged with the cup.
Figure 29A:
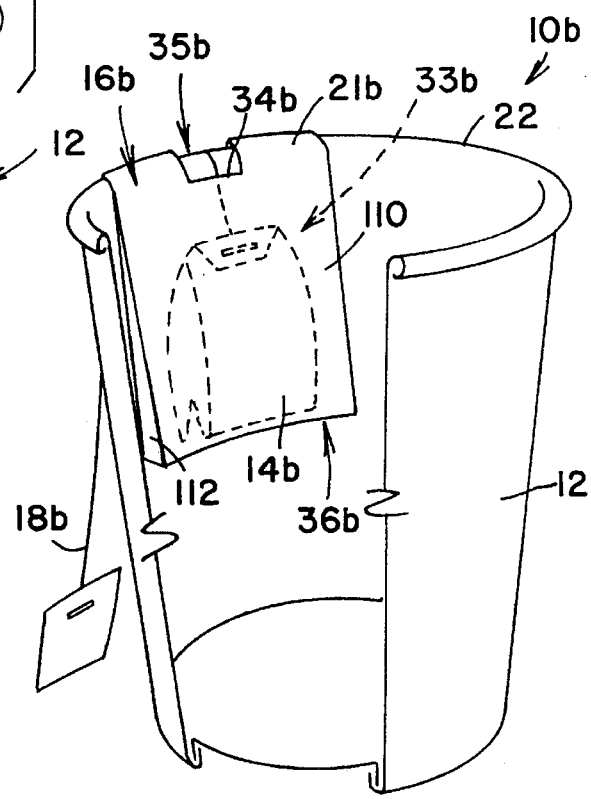
FIG. 29a is a partly broken away perspective view of the holder and cup as shown in FIG. 28 but showing the tea bag withdrawn into the holder.

FIGS. 27–29 show an embodiment of the invention in which a holder 16b is not bonded to the cup 12 at the factory, and which uses a standard tea bag 14b. Also, holder 16b may use the tea bag assembly 13 of system 10. Holder 16b may be removably engaged with the top 22 of cup 12, for example, as described below, or adhered thereto, for example, by an adhesive (engaging means). Holders 16b includes two major wall sections 110, 111, and two minor wall sections 112, 113 which space wall sections 110 and 111 apart. The wall sections 110 and 111 are joined at top 21b of holder 16b and curled to form a curved flange (engaging means) in which the top lip 22 of cup 12 is received to support holder 16b therefrom. The bottom edges 115, 116 are spaced apart and unconnected to an opening 36b. Another opening 35b is formed in the top 21b of holder 166. The tea bag 14b is coupled to holder 16b by extending string 18b through opening 36b into compartment 33b and out of opening 35b.

Holder 16b is engaged with the upper lip 22 of cup 12, as shown in FIG. 28, and is ready to be used since tea bag 14b is not enclosed in a protective jacket which would have to be removed as described for system 10 before water is poured into the cup. Referring to FIG. 28, hot water is poured into cup 12 and the tea is steeped as usually done with a string-attached tea bag. When the tea is brewed to the desired strength, the string is pulled to withdraw the tea bag 14b into the compartment 33b of holder 16b. This stops brewing as described above for systems 10 and 10a. Brewing and withdrawing the tea bag 14b into compartment 33b may be done with the cover (not shown) engaged on cup 12, or with the cover off. Holder 16b, tea bag 14b and a standard cup 12 provide the same benefits and advantages as system 10a. In addition, a removable holder 16b has the advantages that at an appropriate time it can be grasped and removed from the cup, and that it can be used with non-disposable cups. The width of compartment 33b is such as to wedge the tea bag 14b therein and hold it there without having to engage or hold the string 18b. Another advantage of holder 16b is that one may use it with a standard cup which may have been pre-printed. This allows one to continue purchasing pre-printed or standard cups from the usual source, and simply place the holder 16b therein.

The holder 16b may be formed from a single sheet which is cut, folded and sealed, or from separate sheets, in manners which will be known by those having skill in the relevant art(s).

Figure 29B:
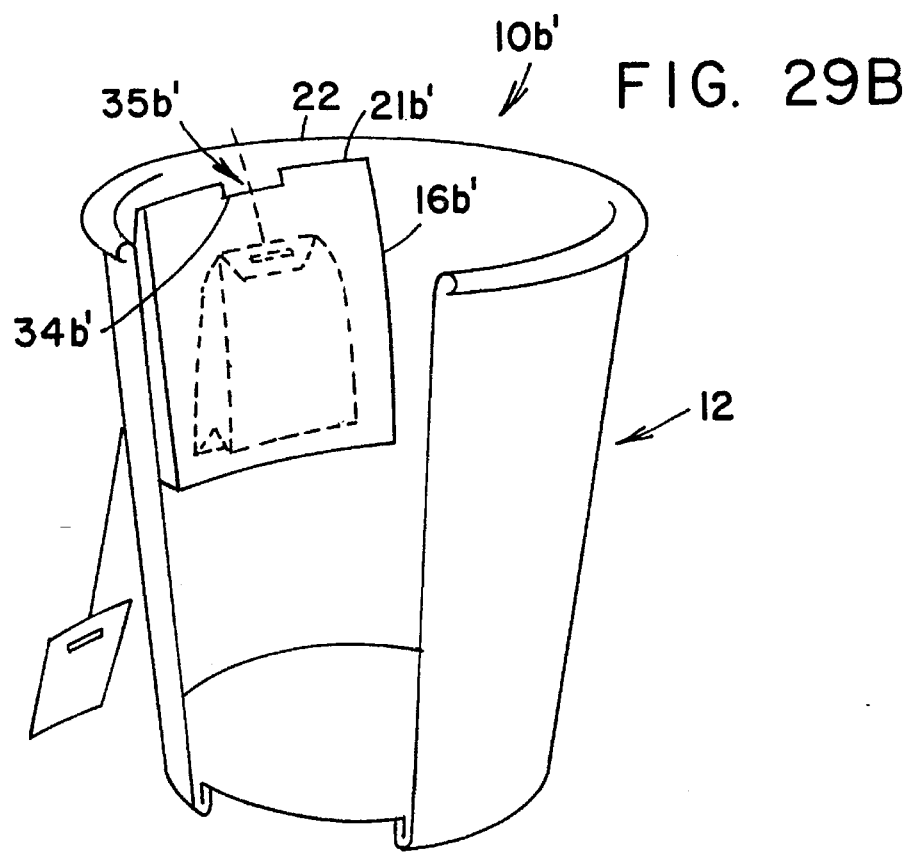
FIG. 29b is a partly broken away prospective view similar to that of FIG. 29 showing a cup with a holder modified from the one shown in FIG. 29.

Another version of a holder or insert 16b' similar to that illustrated in FIGS. 27–29 is shown in FIG. 29b. Holder 16b' does not have a curled top edge 21b, and does not engage the top of cup 12. Instead, the holder 16b' has a straight top edge 21 which is bonded to the top of cup 12 below the top curled edge 22 thereof. This arrangement provides the advantages of holders 16, 16a, 16c, etc. with respect to a continuous top edge 22 of the cup, while providing an holder 16b' as an easily insertable item since it only need be bonded to the cup sidewall 32 along the top 21 of the holder. Holder 16e may similarly be provided with a straight top 21 (not shown) and bonded therealong to a cup 12.

Figure 30:
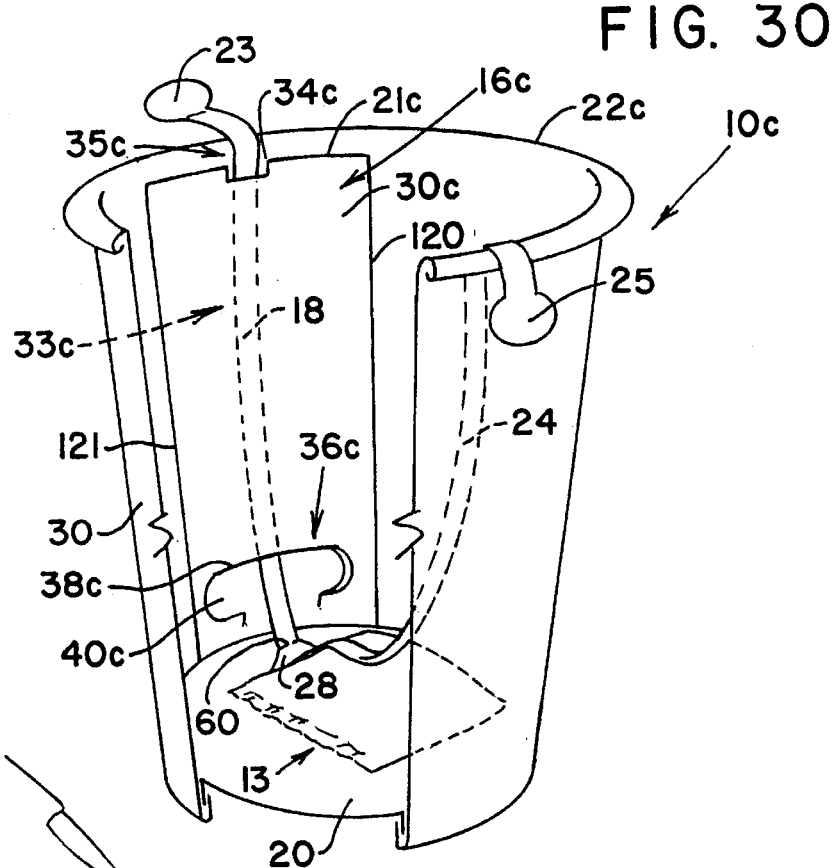
Figure 31:
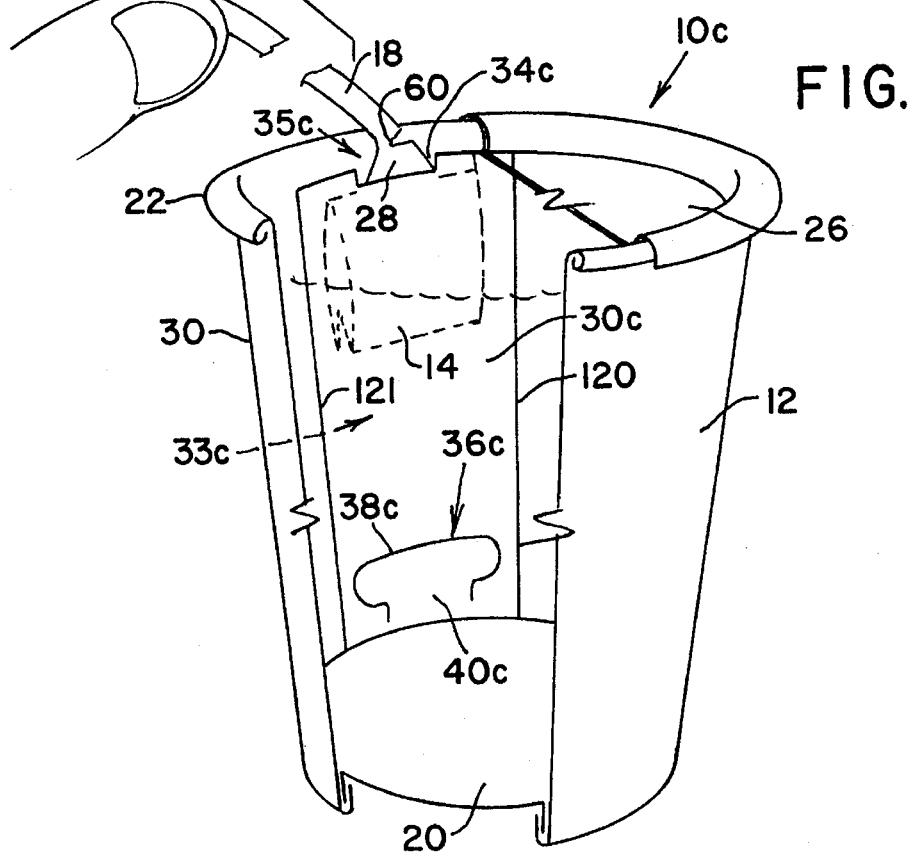

Another embodiment of a single serving, disposable tea brewing system 10c is shown in FIGS. 30 and 31. In system 10c, tea bag assembly 33 may be the same as tea bag assembly 13 of system 10, but in holder 16c and the cup 12c differ from those of system 10. Specifically, holder 16c has a wall section 30c which is integrally joined to the cup side wall 32c at along one side 120, is bonded to cup 12c along the opposite side 121, the top 21c and the bottom 19c, and has a different shaped opening 36c. The end of pull tab 24 of tea bag assembly 13 is not adhered to the end of pull tab 23, but is draped over the cup 12c on the opposite side from holder 16c. As illustrated by FIGS. 30–33, system 10c operates to brew a single serving of tea and to stop brewing as generally described for system 10.

Cup 12c with holder 16c may be manufactured and fabricated as described below and illustrated by FIGS. 43–50, or in other manners which will be known by those having skill in the relevant art(s).

FIGS. 34–37 show another embodiment of the invention in which a holder 16e is not bonded to the cup 12 at the factory, and which uses a standard tea bag 14b. Together standard cup 12, holder 16e and standard tea bag 14b form a disposable, single serving tea brewing system 10e. Holder 16e is similar to holder 16b shown in FIGS. 27–29, and may be removably engaged with the top 22 of cup 12 or adhered thereto. Like holder 16b, holder 16e includes two major wall sections 110e, 111e, and two minor wall sections 112e, 113e which space wall sections 110e and 111e apart and form a compartment 33e therebetween. The wall sections 110e and 111e are joined at top 21e of holder 16e and curled to form a curved flange in which the top lip 22 of cup 12 is received to support holder 16e therefrom. Unlike the bottom edges of holder 16b which are spaced apart to form an opening therebetween, the bottom edges 115e, 116e of holder 16e are joined together to close the compartment 33e (FIG. 37), and a cut 38c is made in wall section 110e to form an opening 36c thereat and a hinged door 40c which opens and closes the opening. In the embodiment shown in FIGS. 34–37, the cut 38c, the opening 36c and the hinged door 40c are the same as in the embodiment of FIGS. 30–31. However, the cut may take other shapes, for example, may be the same as cut 38 in the embodiment of FIG. 1. The tea bag 14b is coupled to holder 16e by extending string 18b through opening 36c into compartment 33e and out of opening 35c at the top of holder 16e.

Holder 16e of FIGS. 34–37, like holder 16b of FIGS. 27–29, is engaged with the upper lip 22 of cup 12, and is ready to be used since tea bag 14b is not enclosed in a protective jacket which would have to be removed as described for system 10 before water is poured into the cup. Referring to FIG. 36, with tea bag 14b at the bottom of the cup 12, hot water is poured into cup 12 and the tea is steeped as usually done with a string-attached tea bag. When the tea is brewed to the desired strength, the string is pulled withdraw the tea bag 14b into the compartment 33e of holder 16e, as shown by the broken line outline of tea bag 13b within holder 16e in FIG. 36 and in full lines in FIG. 37. This stops brewing as described above. Brewing the tea and then withdrawing the tea bag 14a into compartment 33e may be done with the cover (not shown) engaged on cup 12, or with the cover off.

Holder 16e may also use the tea bag assembly 13 of system 10. System 10e provides the same benefits and advantages discussed above for system 10b. The holder 16e may be formed from a single sheet which is cut, folded and sealed, or from separate sheets, in manners which will be known by those having skill in the relevant art(s).

FIGS. 38–42 illustrate another embodiment of a tea bag assembly 13c, which includes a stringless tea bag 14c, and a holder 120 for holding the tea bag 14c. As shown in FIG. 39, the holder 120 has opposed major sides 121, 122 and opposed minor sides 123, 124 which are sized so that the tea bag 14c is snugly received in the holder 120. The major sides have slotted openings 125 therein to allow water to pass therethrough and through the tea bag 14c. A flexible element or pull tab 128 is attached to an end of the major side 122 through a tapered transition region 129. The tea bag assembly 13c may be used with any of the holders 16–16e described above. FIG. 42 illustrates use of tea bag assembly 13c with holder 16e. The transition region 129 performs the same functions as transition region 28 of tea bag assembly 13 in FIG. 1. The pull tab 128 may included a pre-weakened region in the form of a score line or perforation 60, as does pull tab 28 of tea bag assembly 13 of FIG. 1, so that the pull tab may be severed after the tea bag assembly 13c is lodged in the compartment 33e of holder 16e.

Figure 45:
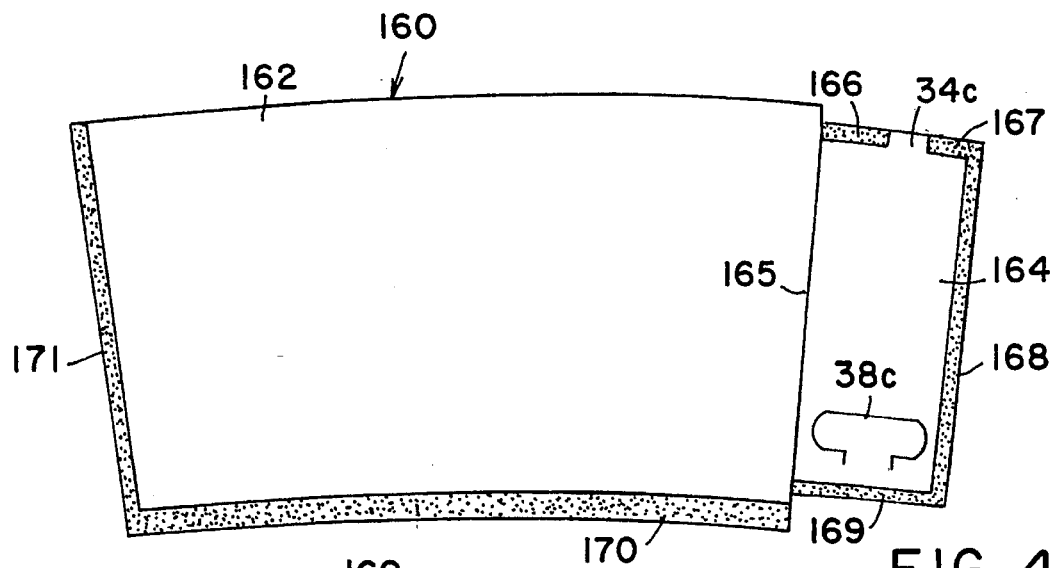
Figure 46:
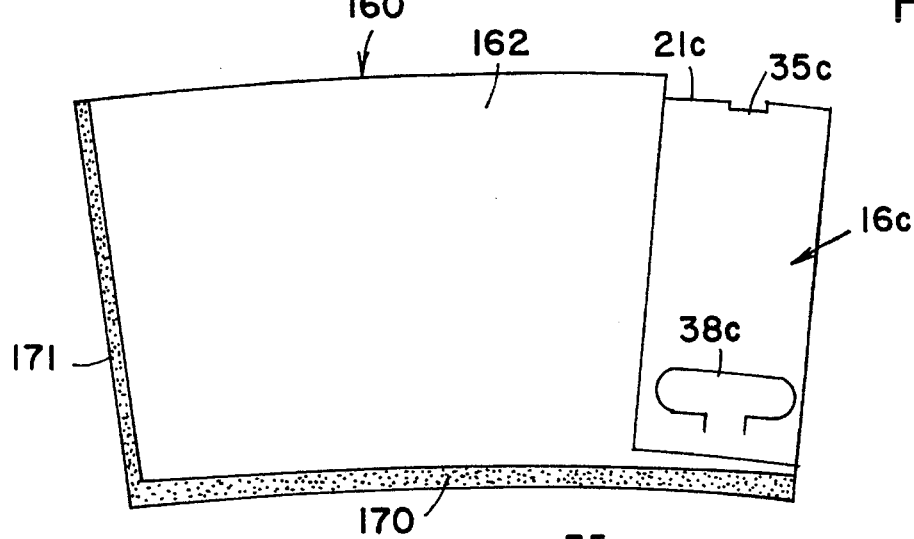

The cup 12c and holder 16c shown in FIGS. 30 and 31 may be manufactured as follows. Referring to FIG. 43, a blank 160 from which both the sidewall 32 (FIG. 30) and the holder wall section 30 will be made is cut from conventional paper stock used to make disposable paper cups. The blank 160 includes a body section 162, which will be formed into the cup sidewall 32, and an extension 164, which will be folded onto and adhered to the body section 162 to form the holder 16c. As shown in FIG. 44, the cut 38c which forms the opening 36c for the tea bag assembly 13c (FIG. 30) is made in extension 164 and the blank is scored along a line 165 where the extension 164 is joined to the body portion 162. The score line 165 facilitates bending the extension onto the body portion. As illustrated by the shaded areas in FIG. 45, peripheral portions 166–171 of the blank 160 are heated to melt the thermoplastic coating on the paper. These peripheral portions will be bonded to other parts of the blank 160 or the cup bottom 20. Referring to FIGS. 45 and 46, extension 164 is folded and pressed onto the body portion 162 along the score line 165, and the melted thermoplastic along peripheral portions 166–169 bonds the extension 164 to the body portion 162 to form the compartment 33c which is closed along its periphery by the bonded areas and the integral joining of extension 164 and body portion 162 along score line 165, except for the opening 35c formed by the unbonded region 34c. To facilitate movement of the tea bag assembly 13 within compartment 33c, the central portion of the extension 164 may be spaced from the body portion 162 during manufacture. This may be accomplished, for example, by inserting a spacer element (not shown) between the extension 164 and the body portion 162 through the opening 35c. Other methods will be known to those having skill in the relevant arts. FIG. 46 shows the holder 16c fully formed (except for curling the top 21c onto the top edge of the cup).

Figure 47:
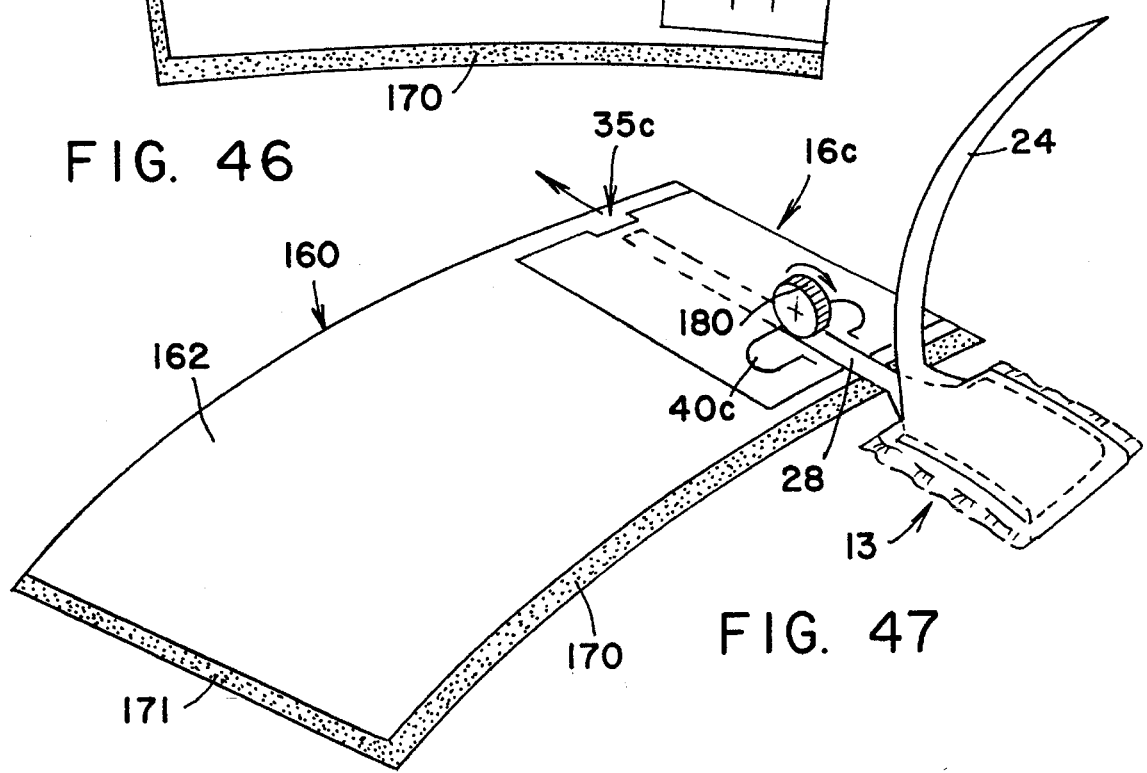
Figure 51:
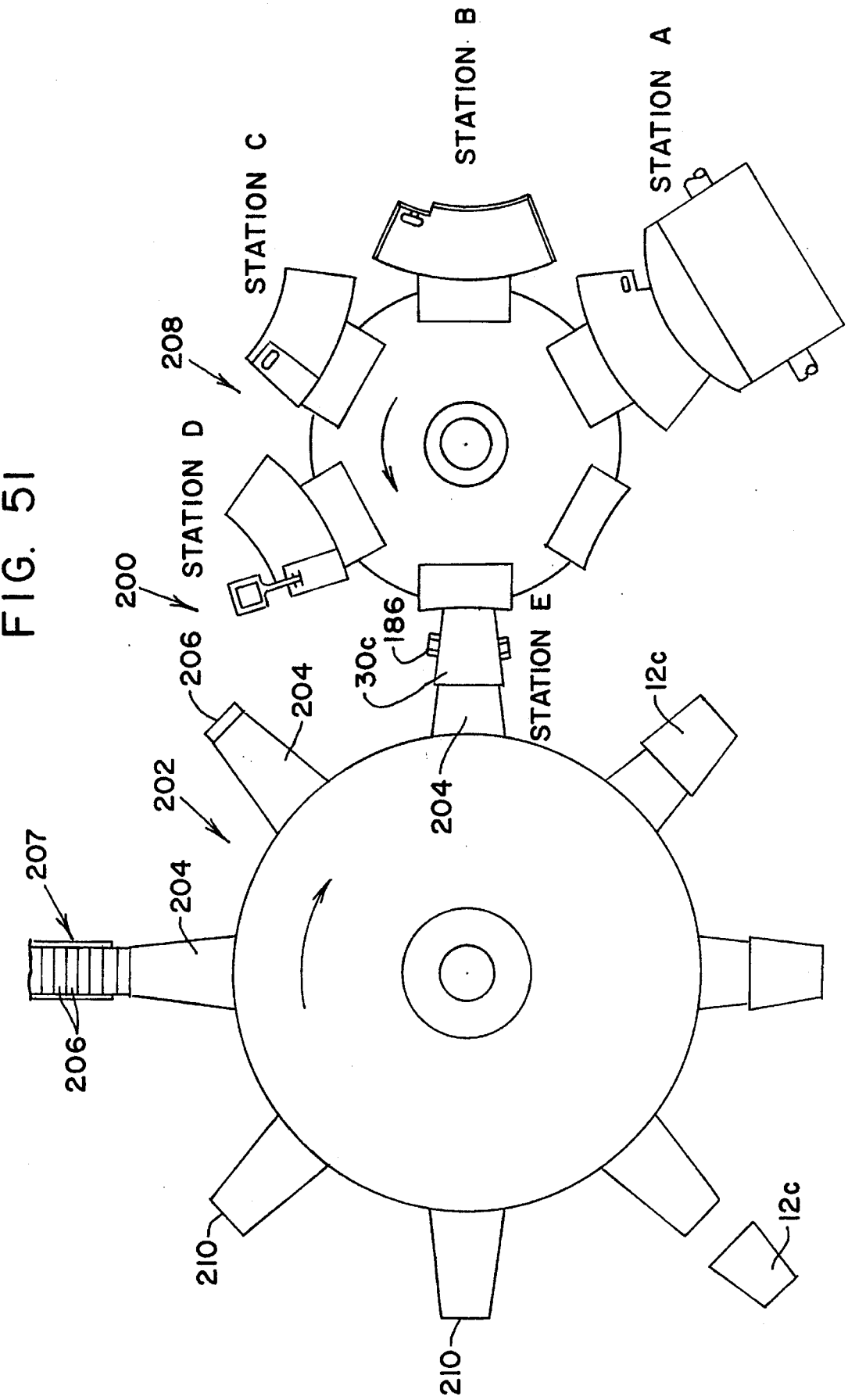
FIG. 51 is a schematic view showing one multi-station apparatus from which the cup and holder of FIG. 30 might be made.

The pull tab 18 may be passed through compartment 33c either before extension 164 is folded over and bonded to body portion 162, or after. FIG. 47 illustrates a method for passing the pull tab through opening 35c after the holder 16c has been formed. A wheel 180 contacts the pull tab 18 of the tea bag assembly 13 and rolls the pull tab 18 into the compartment 33a by pushing it forward through opening 36c. Hinged door 40c may be pressed against body portion 162 by means not shown to widen the opening 36c and facilitate passage therethrough of the end 23 of the pull tab 18. Also a spatula or shield may separate the pull tab 18 from the melted thermoplastic on peripheral region 170 as the pull tab passes thereover so that the pull tab does not adhere to the body portion or pick up melted thermoplastic. Continued rolling of the wheel against the pull tab 18 will move it through compartment 33c and out opening 35c. Other methods of passing the pull tab 18 through the compartment 33a will be known to those having skill in the art.

Figure 50:
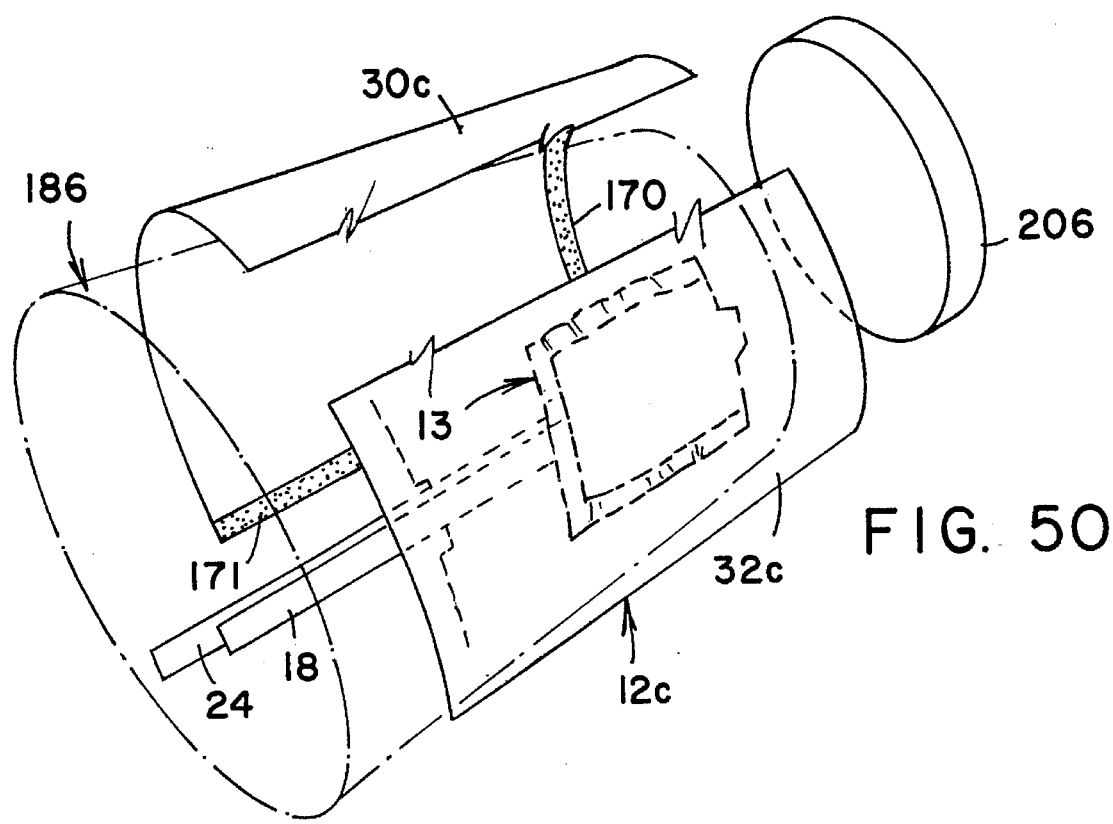
FIG. 50 is an exploded perspective view of the apparati of FIGS. 48 and 49 illustrate the connection of the cup sidewall with the holder and tea bag assembly with the cup bottom.

FIGS. 48–50 show how blank 160 with holder 16c may be formed into cup sidewall 32c and connected with the cup bottom 20. The blank 160 is positioned adjacent a mandrel 186 which has a recess 187 sized to receive therein holder 16c and the tea bag assembly 13 which is folded against the holder 16c with the peripheral portion 170 of blank 160 projecting from the end of the mandrel. The cup bottom 20 is moved adjacent the end of the mandrel and the sidewall blank 160 is wrapped around the mandrel 186 by a tubular mold 190 having hinged mold halves 190, 191 so that melted thermoplastic on the portion 170 of the sidewall blank contacts the cup bottom 20 and so that the melted thermoplastic along the peripheral portion 171 of the blank 160 overlaps the free edge of holder 16c to bond the cup bottom to the sidewall and the peripheral portion 171 of the sidewall blank to the edge of holder 16c.

Sidewall 32c with holder 16c may be made by any suitable apparati. For example, conventional machinery on which blanks are assembled and formed into a cup may be used, as modified to carry out the functions discussed above. Descriptions of such machinery may be found, for example, in the patent literature, including U.S. Pat. Nos. 3,301,145, 3,745,891 and 4,349,345 to Bodendoerfer; U.S. Pat. No. 3,134,307 to Loeser and U.S. Pat. No. 4,490,130 to Konzal et al., the disclosures of which are incorporated herein by reference. For example, referring to FIG. 50, cup-forming machine 200 comprises a rotatable turret 202 containing a plurality of mandrels 204 which carry cup bottom blanks 206 from a magazine supply 207 to a rotatable sidewall forming turret 208, at station E of which a sidewall 30c is wrapped around a mandrel 204 with a bottom blank 206 and formed into cup 12c. Finished cups 12c are carried by turret 202 away from the sidewall forming turret 202 and ejected. The bottom blanks are formed conventionally. All of the mandrels 204 on turret 202 are the same. They are non-rotatable and are shaped in accordance with the cup shape desired, e.g., tapered to make tapered cups. At the outer, smaller diameter end of each mandrel 204 is a flat surface 210 in which there are conventional pneumatic inlet openings (not shown) to which a vacuum is applied to withdraw a bottom blank 206 from the magazine supply 207. Thereafter, a side wall blank 30c is wrapped around a mandrel 204 with bottom blank 206 at station E, and a cup 12c formed. A finished cup is ejected from a mandrel 204 by, for example, supplying positive air pressure to the openings at the end of the mandrel instead of a vacuum.

A sidewall blank 162 is processed into a sidewall 30c at stations A–E surrounding turret 208. The partially processed blank 160 with the extension 164, cut 38c and score line 165 shown in FIG. 43 fed to the turret 208 at station A is made by punching the blank from a web or sheet with a blanking die (not shown), punching the cut 38c in the lower end of the sidewall blank 162 with a die punch (not shown), and scoring the line 165 with a scoring die (not shown). The turret 208 then rotates the partially processed blank to preheat station B, where heat is applied to melt the thermoplastic at the peripheral portions 166–171 (FIG. 45). The turret 208 then rotates the blank 160 to a folding station C, where the extension 164 is folded onto the body portion 162 of the blank 160 and heat sealed to form compartment 33c. A mandrel (not shown) is positioned under extension 164 through opening 35c so that the extension wall 164 is spaced from the body portion 165. During the folding process, an edge (not shown) is placed along the score line 165 to assist in folding the extension 164 onto the body portion 162. Folding may be accomplished with the use of compressed air directed on the extension 162. The pull tab 18 is attached to holder 16c in a separate operation at station D, as described above and illustrated in FIG. 47. After being withdrawn from bottom blank magazine 207, the bottom blanks are heated and then indexed to station E. At station E, the sidewall blank 160 with the tea bag assembly 13 attached thereto is wrapped around the mandrel 186 and closed as described above with reference to FIGS. 48–50. After the bottom blank 20 and the sidewall 30c are joined at station E, the cup undergoes several conventional bottom and top finishing operations in stations adjacent turret 202 before being ejected from turret 202.

While the invention has been described and illustrated in connection with preferred embodiments, many variations and modifications as will be evident to those skilled in this art may be made without departing from the spirit and scope of the invention. For example, holders having shapes and configurations other than those illustrated may be provided and may be mounted or attached to a drink container in ways other than those illustrated, and a packet may be moved into a holder in ways other than with a flexible element. For example, a holder may be constructed so as to facilitate pushing a packet therein using a relatively stiff implement such as a spoon or plastic stirrer. Also, different size and shape packets may be used and means other than a flexible element may be attached for moving a packet into a holder. The invention as set forth in the appended claims is thus not to be limited to the precise details of construction set forth above as such variations and modifications are intended to be included within the scope of the appended claims.

What is claimed is:

1. A drink container and a holder supported by said drink container, said holder having an opening thereto positioned such that a packet containing material used to make a drinkable liquid product in said drink container with the liquid in said drink container may be moved into said holder through said opening without removing the packet from said drink container, said opening of said holder within said drink container and at least a portion of said holder adjacent said opening being exposed to be contacted by the liquid in said container during normal use thereof, said holder being constructed to substantially inhibit liquid flow through the packet when in said holder and said holder is in said container with liquid in said container.

2. The drink container and holder of claim 1 wherein said drink container and holder are disposable.

3. A disposable drink system comprising a container, a packet containing a concentrate which when exposed to a liquid makes a drinkable liquid product, a holder supported by said drink container, and an elongated element coupled to said packet within said drink container and operative to move said packet in said drink container from the exterior of said drink container, said holder having an opening thereto positioned such that said packet may be moved by said elongated element into said holder through said opening without removing said packet from said drink container, said opening and at least a portion of said holder adjacent thereto being exposed to be contacted by the liquid in said container during normal use thereof, said holder being constructed to substantially inhibit liquid flow through said packet when in said holder and said holder is in said container with liquid in said container.

4. The disposable system of claim 3 wherein said elongated element is flexible and said holder has another opening spaced from said opening, said elongated flexible element passing from the interior of said container into said holder through said opening, passing out of said holder through said other opening and terminating in a free end accessible from the exterior of said container so that pulling said free end of said elongated flexible element away from said holder draws said packet into said opening.

5. A disposable drink container and a holder therein into which a packet may be moved from the interior of said drink container, the packet containing or having contained a concentrate which with the liquid makes a drinkable liquid product when exposed to the liquid, said holder defining a compartment having an opening in said container sized to allow the packet to enter said compartment from the interior of said container, said opening and at least a portion of said compartment adjacent thereto being exposed to be contacted by the liquid in said drink container during normal use thereof, said compartment being sized to receive the packet in a compressed state thereof and thereby substantially inhibit the flow of liquid through the packet when in said compartment and when said holder is in said container with liquid in said container and said holder is positioned such that the packet may be moved to pass through the opening and enter in and be engaged by said compartment without removing the packet from said container.

6. A disposable drink system comprising a container, a packet of a concentrate with which a liquid makes a drinkable liquid product when exposed to the liquid, and a holder in said container into which said packet may be moved, said packet having a flexible element connected thereto, said holder having an opening in said container, said opening and at least a portion of said holder adjacent thereto being exposed to be contacted by the liquid during normal use of said drink container, said opening being sized to allow said packet and its flexible element to be passed therethrough from the interior of said container, said flexible element passing through said opening into said holder and passing out of said holder through another opening thereto and being accessible outside of said container, whereby said flexible element may be grasped and used to move said packet into and through said opening into said holder, said holder being positioned such that said packet may be moved to pass through said opening and enter said compartment without removing said packet from said container, and said holder being constructed to engage and compress said packet when said packet is moved therein and thereby substantially inhibit the flow of liquid through said packet when in said holder and said holder is in said container with liquid in said container.

7. A disposable drink container and a holder therein having a compartment into which a packet may be moved from the interior of said drink container, the packet containing or having contained a dissolvable or non-dissolvable concentrate which with a liquid makes a drinkable liquid product when exposed to the liquid, the packet having a flexible element connected thereto, said holder having a first opening in said container sized to allow the packet and its flexible element to be passed therethrough from an exterior or said holder into said compartment and a second opening sized to permit the flexible element but not the packet to pass therethrough and be accessible outside of said container, and said holder being positioned such that when the flexible element passes through said first and second openings and is accessible outside of said drink container, the flexible element may be grasped and used to move the packet into said compartment through said first opening without removing the packet from said container, said holder being constructed to substantially inhibit liquid flow through the packet when the packet is in said holder and said holder is in said container with liquid in said container.

8. A disposable drink system comprising a drink container, a packet of a concentrate which with a liquid makes a drinkable liquid product when exposed to the liquid and a holder having a compartment in said container into which said packet may be moved, said packet having a flexible element connected thereto, said holder having a first opening in said container sized to allow said packet and its flexible element to be passed therethrough from an exterior of said holder to an interior of said holder and a second opening sized to permit said flexible element but not said packet to pass therethrough, said flexible element passing through said first and second openings and being accessible outside of said holder, and said holder being positioned such that said flexible element may be grasped and used to move said packet into said compartment through said first opening without removing said packet from said container, said holder being constructed to substantially inhibit liquid flow through the packet when in said holder and said holder is in said container with liquid in said container.

9. A holder for a spent packet containing or having contained a concentrate used to make a drink product with liquid in a drink container and means for engaging said holder with the drink container such that a substantial portion of said holder is positioned exposed in the drink container to be contacted by liquid in the container during normal use of the container, the spent packet having a flexible element connected thereto and said holder being constructed to pass said flexible element in and out of said holder such that a portion of the flexible element passing out of said holder may be grasped and used to move the packet into engagement with said holder without removing the packet from the container, said holder being constructed to substantially inhibit liquid flow through the packet when the packet is engaged by said holder and said holder is in the container with liquid in the container.

10. A packet containing a concentrate which when exposed to a liquid makes a drinkable liquid product and a holder engaged or engageable with a drink container and into engagement with which said packet may be moved from the interior of the drink container, said packet having a flexible element connected thereto, and means for engaging said holder with the drink container such that a substantial portion of said holder is in the drink container exposed to be contacted by the liquid in the container during normal use thereof, said flexible element passing in and out of said holder and being movably coupled thereto such that when said holder is engaged with the drink container, a portion of said flexible element passing out of said holder may be grasped and used to move said packet into engagement with said holder without removing said packet from the container, and said holder being constructed to substantially inhibit liquid flow through the packet when in said holder and said holder is in the container with liquid in the container.

11. The structure of claim 10 wherein said holder has a compartment therein having first and second openings thereto, said first opening being sized to allow said packet and the flexible element to pass therethrough and the second opening being sized to allow the flexible element but not said packet to pass therethrough, in use the flexible element being passed through the first and second openings and the portion thereof passing out of said second opening being accessible to be grasped, whereby said packet may be moved through said first opening into said compartment by said flexible element.

12. The structure of claim 1 or 5 wherein said holder has an another opening therein spaced from said opening, said openings being positioned such that an elongated element attached to the packet may pass from the interior of said container into said holder through said opening and pass out of said holder through said other opening.

13. The structure of claim 1 or 3 wherein said holder is sized to receive the packet therein in a compressed state and thereby substantially inhibit liquid flow through the packet.

14. The structure of claim 13 wherein said holder is substantially impervious to the liquid except for said opening.

15. The structure of claim 14 comprising a flap hinged to close said opening after the packet has been moved into said holder, and thereby substantially inhibit the flow of liquid through the packet.

16. The structure of claim 5 or 6 wherein said compartment is substantially impervious to the liquid except for said opening.

17. The structure of claim 16 comprising a flap hinged to close said opening after the packet has been moved into said holder.

18. The structure of claim 7, 8, 9 or 10 wherein the holder is made of material substantially impervious to the liquid added to the container.

19. The structure of claim 7, 8 or 11 wherein the holder is closed between the first and second openings.

20. The structure of claim 7, 8 or 11 wherein the first and second openings are spaced sufficiently so that the packet fits in the holder between the first and second openings.

21. The structure of claim 7, 8 or 11 wherein the second opening is above the first opening relative to the drink container when the holder is engaged therewith.

22. The structure of claim 7, 8 or 11 wherein when the holder is positioned in the container adjacent a sidewall thereof and is sized to extend for a major part of the side wall of the drink container with the first opening being near the bottom of the drink container and the second opening being near the top of the drink container.

23. The structure of claim 7 or 8 wherein said first opening and at least a portion of said compartment adjacent thereto are positioned within said drink container exposed to be contacted by the liquid during normal use of said drink container, and wherein said compartment is sized to compress a packet when therein to thereby substantially inhibit the flow of liquid through the packet.

24. The structure of claim 7, 8 or 11 wherein the holder is positioned in the container adjacent a sidewall thereof and is sized to extend for a minor part of the side wall of the drink container with the first opening being spaced a substantial distance above the bottom of the drink container and the second opening being above the first opening.

25. The structure of claim 7 or 8 wherein at least part of the holder is integral with and non-removably attached to the container by the engaging means.

26. The structure of claim 7, 8 or 11 wherein the holder comprises opposed spaced wall sections joined to form the compartment.

27. The structure of claim 8 or 9 wherein the holder comprises opposed spaced wall sections joined to form the compartment, and one of said walls is defined by a portion of a sidewall of said container.

28. The structure of claim 7 or 8 wherein the holder comprises a wall section non-removably attached to a sidewall of the container such that the wall section and a portion of the container sidewall adjacent the wall section define the compartment.

29. The structure of claim 8 or 10 wherein said packet comprises an inner package containing the concentrate and a holder containing the inner package, the holder for the inner package having openings therein to allow liquid to pass therethrough and contact the inner package, the flexible element being connected to the holder for the inner package.

30. The structure of claim 8 or 10 comprising a protective jacket enclosing the packet and means for removing the jacket from the packet while the packet remains within the drink container.

31. The structure of claim 30 wherein the jacket is impermeable and is sealed airtight.

32. The structure of claim 30 wherein the jacket is untreated paper.

33. The structure of claim 32 wherein the jacket is paper coated with a material which at least impedes the flow of air through the jacket.

34. The structure of claim 30 wherein the jacket comprises a sheet folded on itself to form two sheet halves which are joined along their peripheries so as to be relatively easily separated again, and the means for removing the jacket comprises another flexible element connected to the jacket and being of sufficient length to reach and project from the top of the drink container when the packet is at the bottom of the drink container such that the other flexible element when pulled while the flexible element connected to the packet is held separates the sheet halves along their joined peripheries as the entire jacket is pulled completely out of the drink container.

35. The structure of claim 34 wherein the other flexible element is integrally connected to said jacket.

36. The structure of claim 8 or 10 wherein the packet comprises a tea bag attached to one end of the flexible element, and further comprising a closed, easily openable jacket enclosing the tea bag and means connected to the jacket which may be grasped and pulled to open the jacket and separate it from the tea bag, the means connected to the jacket being of sufficient length to reach and project from the top of the drink container when the tea bag is at the bottom of the container.

37. The structure of claim 8 or 11 wherein the flexible element includes a weakened portion close to the packet such that the flexible element may be severed thereat and separated from the packet.

38. The structure of claim 37 wherein the second opening is located adjacent and below a top of the drink container, and wherein the flexible element is connected to the packet such that the flexible element may be severed from the packet at the second opening adjacent and below the top of the drink container.

39. The structure of claim 9 wherein said holder has a compartment therein having first and second openings thereto, said first opening being sized to allow said packet and the flexible element to pass therethrough and the second opening being sized to allow the flexible element but not said packet to pass therethrough, in use the flexible element being passed through the first and second openings and the portion thereof passing out of said second opening being accessible to be grasped, whereby said packet may be moved through said first opening into said compartment by said flexible element.

40. The structure of claim 39 or 11 wherein the holder is a separate piece from the drink container and is removably engaged therewith by the engaging means.

41. The structure of claim 39 or 11 wherein the holder is a separate piece from the drink container and is non-removably attached therewith by the engaging means.

42. The structure of claim 39 or 11 wherein the holder comprises opposed wall sections connected to define the compartment therebetween.

43. The structure of claim 42 wherein one of the wall sections has the first opening therein.

44. The structure of claim 42 wherein a portion of the periphery of one of the wall sections is not joined to an interior wall of the drink container which forms a wall section opposed to the one wall section of the holder, the unjoined portion of the one wall section and the interior wall adjacent thereto defining the first opening therebetween.

45. The structure of claim 42 wherein one of the wall sections has the second opening therein.

46. The structure of claim 42 wherein a portion of the periphery of one of the wall sections is not joined to an interior wall of the drink container which forms a wall section opposed to the one wall section of the holder, the unjoined portion of the one wall section and the sidewall adjacent thereto defining the second opening therebetween.

47. The structure of claim 42 wherein the first opening is defined by unjoined portions of the wall sections.

48. The structure of claim 42 wherein one of the wall sections has the second opening therein.

49. The structure of claim 42 wherein the second opening is defined by unjoined portions of the wall sections.

50. The structure of claim 39 or 11 wherein the first opening is positioned to be contacted by the liquid when the holder is engaged with the container during normal use thereof.

51. The structure of claim 50 wherein the first opening is positioned above the second opening.

52. A disposable drink system comprising:
   a drink container having an open top, a closed bottom and a sidewall extending upwardly from said bottom;
   a packet of a concentrate which with a liquid introduced into said container makes a drinkable liquid product when exposed to the liquid;
   a compartment disposed in said drink container between said open top and said bottom closely adjacent said sidewall into which said packet may be moved after the liquid has been introduced into said drink container, said compartment having an opening sized to allow said packet to pass therethrough and enter said compartment and positioned in said container to be contacted by the liquid in the container during normal use thereof;
   said packet being disposed within said drink container exposed to be contacted by liquid introduced into said drink container; and
   a flexible element attached to said packet, coupled to said compartment and accessible from outside of said container such that said packet may be moved from said drink container into said compartment using said flexible element without removing said packet from said container;
   said compartment being constructed such that the flow of liquid between said drink container and said compartment is substantially inhibited when said packet is in said compartment and said compartment is contacted by the liquid.

53. The drink system of claim 52 wherein said flexible element passes through said compartment such that a portion thereof passing out of said compartment is accessible in the initial exposed position of said packet such that said portion may be grasped and pulled to move said packet from said drink container into said compartment.

54. The drink system of claim 53 comprising a removable cover dimensioned to engage and cover said top of said drink container with said portion of said flexible element extending out of said drink container between said cover and said top of said drink container such that said portion of said flexible element may be moved between said cover and said top when said cover is engaged, whereby said packet may be moved within said drink container with said cover engaged with said drink container.

55. The drink system of claim 54 wherein said flexible element has a weakened portion located so that said flexible element may be severed and separated from said packet and said drink container while said cover is engaged with said drink container at a point on said flexible element below the top of the drink container.

56. The drink system of claim 52 wherein said compartment has a first opening sized to allow the packet and its flexible element to be passed therethrough from an exterior of said compartment to an interior of said compartment and a second opening spaced from said first opening sized to permit the flexible element to pass therethrough, a portion of said flexible element passing out of said second opening being accessible such that it may be grasped and used to pull said packet into said compartment through said first opening.

57. The drink system of claim 56 wherein said flexible element is substantially narrower than said packet and is connected to said packet by a tapered region which increases in size from said flexible element to said packet, and wherein said second opening is sized to engage and stop said tapered region when said flexible element is pulled away from said second opening and said tapered region reaches said second opening.

58. The drink system of claim 57 wherein said flexible element includes a pre-weakened portion adjacent said tapered region to facilitate severing said flexible element from said packet when said tapered region is engaged in said second opening.

59. The drink system of claim 56 wherein said compartment comprises a wall section and a portion of said sidewall of said drink container, said wall section being affixed about its periphery to said sidewall and otherwise spaced from said sidewall to receive therebetween said packet.

60. The drink system of claim 59 wherein said sidewall of said drink container is a one-piece panel and said wall section of said compartment is integrally joined to said sidewall such that said sidewall and said compartment wall section are a one-piece panel, said wall section being folded over a portion of the interior of said sidewall and sealed along exposed peripheral portions thereof to said interior of said sidewall to form said compartment, said sidewall being sealingly joined to itself to form a closed generally tubular panel to which said drink container bottom is affixed.

61. The drink system of claim 59 wherein said wall section is a separate piece from said drink container sidewall and is attached to said drink container solely along selected peripheral portions thereof to define said compartment together with a portion of the sidewall of said drink container.

62. The drink system of claim 59 wherein said drink container and said wall section are made of the same material.

63. The drink system of claim 59 wherein said drink container and said wall section are made of a paper coated with a thin film of thermoplastic.

64. The drink system of claim 59 wherein said drink container and said wall section are made of plastic.

65. The drink system of claim 59 wherein said drink container and said wall section are integrally molded.

66. The drink system of claim 59 wherein said drink container and said wall section are made from sheet material which is worked to form said drink container and said compartment.

67. The drink system of claim 59 wherein said drink container and said wall section comprise sheet material and molded material which form said compartment and said drink container.

68. The drink system of claim 56 wherein said first opening comprises a hinged flap adapted to substantially close said first opening when said packet is moved into said compartment so that the flow of liquid between said drink container and said compartment is inhibited.

69. The drink system of claim 68 wherein said hinged flap is defined by a curved cut in said wall section.

70. The drink system of claim 52 wherein said compartment is sized such that said packet is compressed when moved from said drink container into said compartment thereby substantially inhibiting the flow of liquid through said packet.

71. The drink system of claim 52 wherein said drink container is a single serving or dosage size and said packet is suitable for making a single serving or dosage of said liquid product.

72. The drink system of claim 52 wherein said concentrate is in shredded, granular, powder, liquid or solid form.

73. The drink system of claim 52 wherein said concentrate is in leaf form.

74. The drink system of claim 52 wherein said concentrate is a ground bean.

75. The drink system of claim 52 wherein said concentrate is a tablet, caplet, capsule or gel-cap.

76. The drink system of claim 52 wherein the packet is a tea bag.

77. A method of stopping the infusion mixing, dissolving and the like of a concentrate into a liquid during the preparation of a drinkable liquid product in a drink container, comprising:

providing a packet in the drink container, the packet containing a concentrate from which the liquid product is made by exposing the concentrate to a liquid and having an elongated element extending out of the container;

adding liquid to the container to contact the packet to form a liquid product; and when the liquid product has been formed to the desired strength or concentration, moving the packet in the container using the elongated element outside of the container into a holder in the container through an opening in the holder without removing the packet from the container with at least the holder substantially inhibiting the flow of liquid through the packet while the packet is in the holder and the holder is in the container with liquid in the container.

78. A method of making a drinkable liquid product in a drink container having a cover engageable therewith, comprising:

providing a compartment within the drink container;

providing a packet in the drink container containing a concentrate from which the liquid product is made by exposing the concentrate to a liquid and an elongated element attached to the packet which extends from the drink container for moving the packet within the drink container into the compartment, such that one may move the packet in the container from outside the container, the compartment being capable of substantially inhibiting liquid flow through the packet when the packet is in the compartment and the compartment is exposed to liquid in the container;

adding liquid to the container;

engaging the cover with the container with the elongated element passing therebetween; and moving the packet into the compartment with the cover engaged to the liquid-containing drink container using the elongated element.

79. A method of making a drinkable liquid product in a drink container having a cover engageable therewith, comprising:

providing a compartment within the drink container:

providing a packet in the drink container containing a concentrate from which the liquid product is made by exposing the concentrate to a liquid and a flexible element attached to the packet and extending from the drink container for moving the packet within the drink container from outside the container:

adding liquid to the container;

engaging the cover with the container with the flexible element passing therebetween; and moving the packet into the compartment using the flexible element while the cover is engaged to the liquid-containing drink container, the compartment being capable of substantially inhibiting liquid flow through the packet when the packet is in the compartment and the compartment is exposed to liquid in the container.

80. A disposable drink system comprising:

a drink container having an open top, a closed bottom and a sidewall extending upwardly from said bottom;

a packet of a concentrate which with a liquid introduced into said container makes a drinkable liquid product when exposed to the liquid;

a compartment disposed in said drink container between said open top and said bottom closely adjacent said sidewall into which said packet may be moved after the liquid has been introduced into said drink container, said compartment having a first opening sized to allow said packet to pass therethrough and enter said compartment and a second opening spaced from said first opening sized to prevent said packet from passing therethrough;

said packet being disposed within said drink container exposed to be contacted by liquid introduced into said drink container; and a flexible element attached to said packet passing through said first opening into said compartment and through said second opening outside of said compartment such that a portion thereof passing out of said compartment is accessible from outside of said container in the initial exposed position of said packet and may be grasped and pulled to move said packet from said drink container into said compartment without removing said packet from said container;

said compartment being constructed such that the flow of liquid between said drink container and said compartment is substantially inhibited when said packet is in said compartment and said compartment is in contact with said liquid.

\* \* \* \* \*